(12) United States Patent
Tsuneki et al.

(10) Patent No.: US 11,914,334 B2
(45) Date of Patent: Feb. 27, 2024

(54) OUTPUT DEVICE, CONTROL DEVICE AND METHOD OF OUTPUTTING EVALUATION FUNCTION VALUE

(71) Applicant: FANUC CORPORATION, Yamanashi (JP)

(72) Inventors: Ryoutarou Tsuneki, Yamanashi (JP); Satoshi Ikai, Yamanashi (JP); Takaki Shimoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 879 days.

(21) Appl. No.: 16/564,595

(22) Filed: Sep. 9, 2019

(65) Prior Publication Data
US 2020/0133208 A1    Apr. 30, 2020

(30) Foreign Application Priority Data

Oct. 29, 2018 (JP) .................................. 2018-202773

(51) Int. Cl.
*G05B 13/02* (2006.01)
*G05B 13/04* (2006.01)
(Continued)

(52) U.S. Cl.
CPC ....... *G05B 13/042* (2013.01); *G05B 13/0265* (2013.01); *G06N 5/022* (2013.01)

(58) Field of Classification Search
CPC ... G05B 13/042; G05B 13/0265; G06N 5/022
See application file for complete search history.

(56) References Cited

U.S. PATENT DOCUMENTS

| 5,371,451 A * | 12/1994 | Toyosawa | G05B 19/19 |
| | | | 700/45 |
| 2014/0358825 A1* | 12/2014 | Phillipps | G06N 20/20 |
| | | | 706/11 |
| 2019/0384329 A1* | 12/2019 | Cybulsky | G05B 13/024 |

FOREIGN PATENT DOCUMENTS

| CN | 108227482 | 6/2018 |
| CN | 108628355 | 10/2018 |

(Continued)

OTHER PUBLICATIONS

Notification of Reasons for Refusal dated Nov. 4, 2020 in corresponding Japanese Patent Application No. 2018-202773 (with English translation).

(Continued)

*Primary Examiner* — Mark A Connolly
(74) *Attorney, Agent, or Firm* — Wenderoth, Lind & Ponack, L.L.P.

(57) ABSTRACT

An object is to make it possible to acquire a parameter or a first physical quantity that has been learned and an evaluation function value and thereby check the progress or the result of machine learning. An output device includes: an information acquisition unit which acquires, from a machine learning device that performs machine learning on a servo control device for controlling a servo motor driving the axis of a machine tool, a robot or an industrial machine, a parameter or a first physical quantity of a constituent element of the servo control device that is being machine learned or has been machine learned and an evaluation function value; and an output unit which outputs information indicating a relationship between the acquired parameter, the first physical quantity or a second physical quantity determined from the parameter and the evaluation function value.

7 Claims, 13 Drawing Sheets

(51) Int. Cl.
    *G06N 5/02*    (2023.01)
    *G06N 5/022*   (2023.01)

(56) References Cited

FOREIGN PATENT DOCUMENTS

| CN | 108693834 |   | 10/2018 |            |
|----|-----------|---|---------|------------|
| DE | 60004528 T | * | 6/2004 | ........... G05B 19/409 |
| JP | 11-31139  |   | 2/1999  |            |
| JP | 2009-124803 |  | 6/2009  |            |
| JP | 2018-152012 |  | 9/2018  |            |

OTHER PUBLICATIONS

Office Action dated Jul. 1, 2022 in corresponding Chinese Patent Application No. 201911021683.8.

* cited by examiner

OUTPUT DEVICE, CONTROL DEVICE AND METHOD OF OUTPUTTING EVALUATION FUNCTION VALUE

This application is based on and claims the benefit of priority from Japanese Patent Application No. 2018-202773, filed on 29 Oct. 2018, the content of which is incorporated herein by reference.

BACKGROUND OF THE INVENTION

Field of the Invention

The present invention relates to an output device, a control device and a method of outputting an evaluation function value, and more particularly relates to an output device which acquires, from a machine learning device that performs machine learning on a servo control device for controlling a servo motor, a parameter or a first physical quantity of a constituent element of the servo control device that is being machine learned or has been machine learned and an evaluation function value and which outputs a relationship between the parameter, the first physical quantity or a second physical quantity determined from the parameter and the evaluation function value, to a control device which includes such an output device and to a method of outputting the evaluation function value.

Related Art

As a technology related to the present invention, for example, patent document 1 discloses a signal converter which includes an output unit that uses a multiplication coefficient pattern mastering method with a machine learning means so as to determine an intended multiplication coefficient pattern, that uses the multiplication coefficient pattern so as to perform a digital filter operation and that displays a digital filter output.

Specifically, patent document 1 discloses that the signal converter includes a signal input unit, an operation processing unit which has the function of characterizing signal data based on input signal data and the output unit which displays an output from the operation processing unit, that the operation processing unit includes an input file, a learning means, a digital filter and a parameter setting means and that in the learning means, the multiplication coefficient pattern mastering method is used with the machine learning means so as to determine the intended multiplication coefficient pattern.

Patent Document 1: Japanese Unexamined Patent Application, Publication No. H11-31139

SUMMARY OF THE INVENTION

Disadvantageously, although in patent document 1, the output from the operation processing unit is displayed, a pattern which is machine learned with the machine learning means is not output, and thus a user such as an operator cannot check the progress or the result of the machine learning. When parameter of a constituent element of a servo control device which controls a servo motor that drives the axis of a machine tool, a robot or an industrial machine is machine learned with a machine learning device, since the parameter and an evaluation function value used in the machine learning device are not generally displayed, an operator cannot check the progress or the result of the machine learning. Even when the evaluation function value is displayed, the operator has difficulty in grasping a machine characteristic from the evaluation function value.

An object of the present invention is to provide: an output device which acquires a parameter or a first physical quantity of a constituent element of a servo control device that has been learned and an evaluation function value, which can check the progress or the result of machine learning from information indicating a relationship between the parameter, the first physical quantity or a second physical quantity determined from the parameter and the evaluation function value and which outputs information that makes it possible to grasp a machine characteristic from the first or second physical quantity; a control device which includes such an output device; and a method of outputting the evaluation function value.

(1) An output device (for example, an output device 200, 200A which will be described later) according to the present invention includes: an information acquisition unit (for example, an information acquisition unit 201 which will be described later) which acquires, from a machine learning device (for example, a machine learning device 100 which will be described later) that performs machine learning on a servo control device (for example, a servo control device 300 which will be described later) for controlling a servo meter (for example, a servo motor 400 which will be described later) driving the axis of a machine tool, a robot or an industrial machine, a parameter or a first physical quantity of a constituent element of the servo control device that is being machine learned or has been machine learned and an evaluation function value; and
an output unit (for example, a control unit 205 and a display unit 209, a control unit 205 and a storage unit 206 which will be described later) which outputs information indicating a relationship between the acquired parameter, the first physical quantity or a second physical quantity determined from the parameter and the evaluation function value.

(2) In the output device of (1) described above, the output unit may include a display unit which displays, on a display screen, the information indicating the relationship between the parameter, the first physical quantity or the second physical quantity and the evaluation function value.

(3) In the output device of (1) or (2) described above, the parameter is a coefficient in a transfer function of the constituent element of the servo control device, and based on the information, the output device may provide an instruction to change the order of the coefficient to the servo control device.

(4) In the output device of any one of (1) to (3) described above, based on the information, an instruction to change or select the parameter of the constituent element of the servo control device or a search range of the machine learning of the first physical quantity may be provided to the machine learning device.

(5) In the output device of any one of (1) to (4) described above, the parameter of the constituent element of the servo control device may include a parameter of a mathematical formula model or a filter.

(6) In the output device of (5) described above, the mathematical formula model or the filter may be included in a velocity feedforward processing unit or a position feedforward processing unit, and the parameter may include a coefficient in a transfer function of the filter.

(7) A control device according to the present invention includes: the output device of any one of (1) to (6) described above;

the servo control device which controls the servo motor that drives the axis of the machine tool, the robot or the industrial machine; and the machine learning device which performs the machine learning on the servo control device.

(8) In the control device of (7) described above, the output device may be included in one of the servo control device and the machine learning device.

(9) A method of outputting an evaluation function value of an output device according to the present invention which is used in the machine learning of a machine learning device that performs the machine learning on a servo control device for controlling a servo motor driving the axis of a machine tool, a robot or an industrial machine, includes:

acquiring, from the machine learning device, a parameter or a first physical quantity of a constituent element of the servo control device that is being machine learned or has been machine learned and the evaluation function value; and outputting information indicating a relationship between the acquired parameter, the first physical quantity or a second physical quantity determined from the parameter and the evaluation function value.

According to the present invention, it is possible to acquire a parameter or a first physical quantity that has been learned and an evaluation function value and thereby check the progress or the result of machine learning from information indicating a relationship between the parameter, the first physical quantity or a second physical quantity determined from the parameter and the evaluation function value. It is also possible to grasp a machine characteristic from the first or second physical quantity.

DETAILED DESCRIPTION OF THE INVENTION

Embodiments of the present invention will be described in detail below with reference to drawings.

First Embodiment

Figure 1:
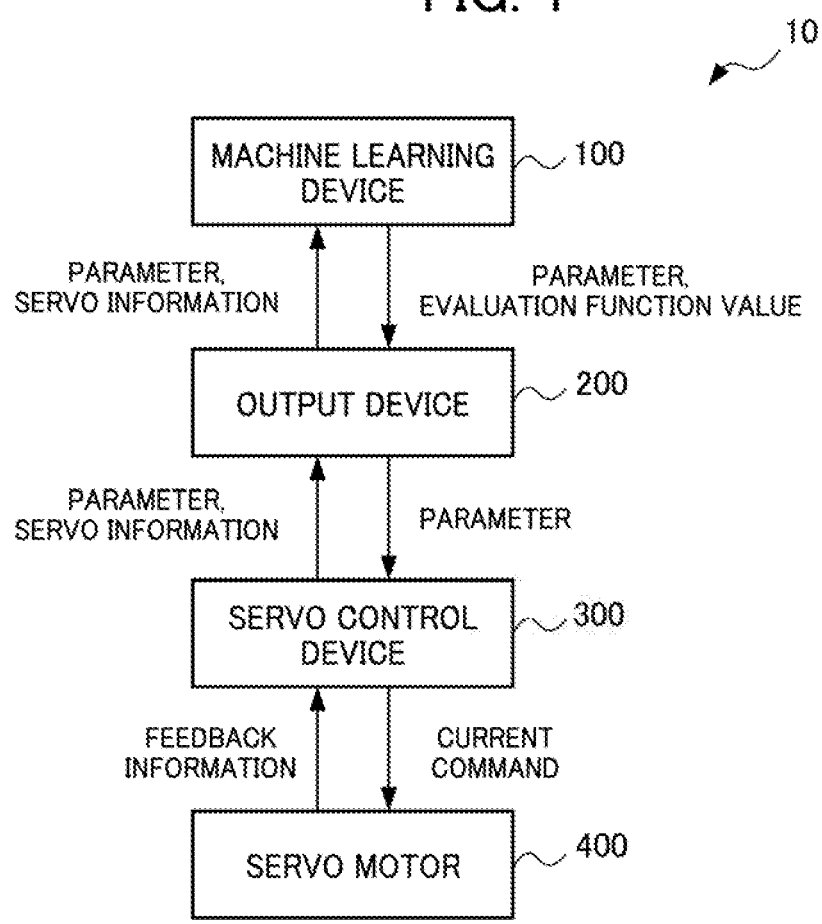
FIG. 1 is a block diagram showing an example of the configuration of a control device according to a first embodiment of the present invention.

FIG. 1 is a block diagram showing an example of the configuration of a control device according to a first embodiment of the present invention. The control device 10 shown in FIG. 1 includes a machine learning device 100, an output device 200, a servo control device 300 and a servo motor 400. The control device 10 drives a machine tool, a robot, an industrial machine or the like. The control device 10 may be provided separately from a machine tool, a robot, an industrial machine or the like or may be included in a machine tool, a robot, an industrial machine or the like. The machine learning device 100 acquires, from the output device 200, information which is used in machine learning and whose examples include control commands such as a position command and a velocity command that are input to the servo control device 300 and servo information such as a position error that is output from the servo control device 300. The machine learning device 100 also acquires, from the output device 200, parameters (for example, coefficients in the transfer function of a velocity feedforward processing unit) of constituent elements of the servo control device 300. The machine learning device 100 may acquire, instead of the parameters of constituent elements of the servo control device 300, physical quantities (for example, an attenuation center frequency, a bandwidth and an attenuation coefficient (damping)) associated with the parameters) (the physical quantities correspond to first physical quantities). The machine learning device 100 machine learns, based on the information which is input, the parameters or physical quantities of constituent elements of the servo control device 300 so as to output, to the output device 200, the parameters or the physical quantities that are being machine learned or have been machine learned and an evaluation function value used in the machine learning.

The output device 200 acquires the control commands such as the position command and the velocity command that are input to the servo control device 300 and the servo information such as the position error that is output from the servo control device 300, and outputs them to the machine learning device 100. The output device acquires, from the machine learning device 100, the parameters or the physical quantities which are being machine learned or have been machine learned, and feeds them to the servo control device 300. The output, device 200 acquires, from the machine learning device 100, the parameters or the physical quantities which are being machine learned or have been machine learned, and outputs information indicating a relationship between the parameters (for example, coefficients in the velocity feedforward processing unit) or values (for example, the center frequency, the bandwidth and the attenuation coefficient (damping) which serve as second physical quantities) calculated from the parameters and the evaluation function value. Examples of the outputting method include screen display in a liquid crystal display device, printing using a printer or the like to paper, storage in a storage unit such as a memory and the output of an external signal through a communication unit. A user such as an operator operates the output device 200 based on the information output from the output device 200, for example, in order to change the order of the coefficients in the transfer function of the velocity feedforward processing unit or the search range of the machine learning. In order to change the order of the coefficients in the transfer function of the velocity feedforward processing unit or the search range of the machine learning, the output device 200 outputs adjustment information to the servo control device 300 or the machine learning device 100.

As described above, the output device 200 has the function of relaying the information (such as the control commands, the parameters and the servo information) between the machine learning device 100 and the servo control device 300, the function of outputting the information indicating the relationship between the parameters or the values calculated from the parameters and the evaluation function value and the adjustment function of outputting the adjustment information for controlling the operations of the machine learning device 100 and the servo control device 300.

The servo control device 300 outputs, based on the control commands such as the position command and the velocity command, a current command so as to control the rotation of the servo motor 400. For example, the servo control device 300 includes the velocity feedforward processing unit which is represented by the transfer function including the coefficients that are machine learned by the machine learning device 100. The servo motor 400 drives the axis of a machine tool, a robot or an industrial machine. The servo motor 400 is included in, for example, a machine tool, a robot or an industrial machine. The servo motor 400 outputs, to the servo control device 300, a detection position and/or a detection velocity as feedback information.

The individual configurations of the control device 10 in the first embodiment will further be described below.

Figure 2:
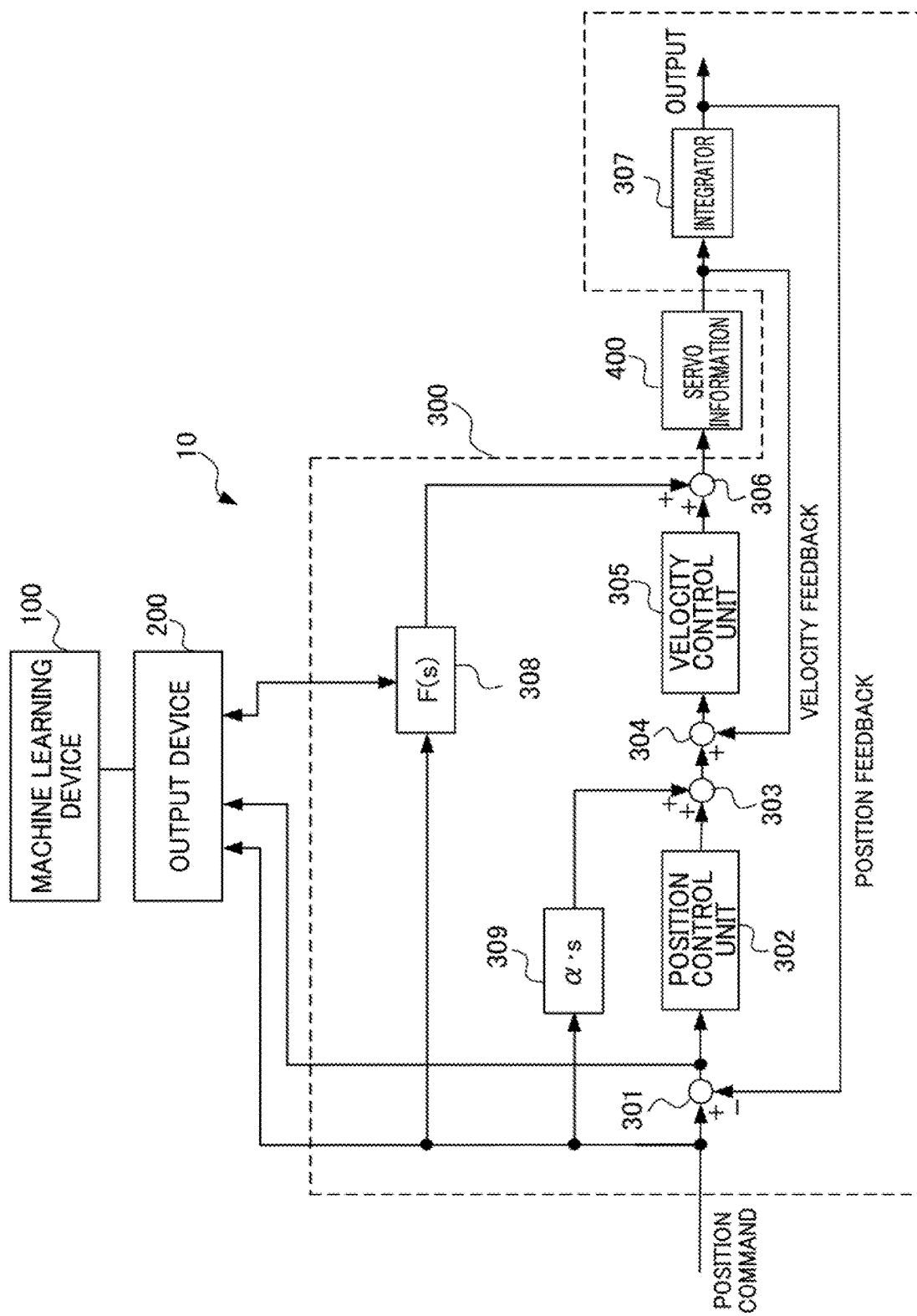
FIG. 2 is a block diagram showing the entire configuration of the control device and the configuration of a servo control device in the first embodiment of the present invention.

FIG. 2 is a block diagram showing the entire configuration of the control device 10 and the configuration of the servo control device 300 in the first embodiment.

The servo control device 300 will first be described. As shown in FIG. 2, the servo control device 300 includes, as constituent elements, a subtractor 301, a position control unit 302, an adder 303, a subtractor 304, a velocity control unit 305, an adder 306, an integrator 307, the velocity feedforward processing unit 308 and a position feed forward processing unit 329.

The position command is output to the subtractor 301, the velocity feedforward processing unit 308, the position feedforward processing unit 309 and the output device 200. The position command is produced by a high-level device based on a program for operating the servo motor 400. The servo motor 400 is included in, for example, a machine tool. When in the machine tool, a table on which a workpiece (work) is mounted is moved in the X-axis direction and in the Y-axis direction, the servo control device 300 and the servo motor 400 shown in FIG. 2 are individually provided for the X-axis direction and the Y-axis direction. When the table is moved in the directions of three or more axes, the servo control device 300 and the servo motor 400 are provided in the respective axis directions. In the position command, a feed rate is set such that a machining shape specified by a machining program is provided.

The subtractor 301 determines a difference between a position command value and the feedback detection position and outputs the difference as the position error to the position control unit 302 and the output device 200. The position control unit 302 outputs a value obtained by multiplying the position error by a position gain Kp to the adder 303 as a velocity command value. The adder 303 adds the velocity command value and the output value (position feedforward term) of the position feedforward processing unit 309 so as to output, the resulting value to the subtractor 304 as the feedforward-controlled velocity command value. The subtractor 304 determines a difference between the output of the adder 303 and a feedback velocity detection value and outputs the difference to the velocity control unit 305 as a velocity error.

The velocity control unit 305 adds a value obtained by multiplying the velocity error by an integral gain $K1v$ and integrating the resulting value and a value obtained by multiplying the velocity error by a proportional gain $K2v$, and outputs the obtained value to the adder 306 as a torque command value. The adder 306 adds the torque command value and the output value (velocity feedforward term) of the velocity feedforward processing unit 308, outputs, through a current control unit which is not shown, the obtained value to the servo motor 400 as the feedforward-controlled torque command value, and thereby drives the servo motor 400.

The rotational angular position of the servo motor 400 is detected with a rotary encoder which is associated with the servo motor 400 and which serves as a position detection unit, and the velocity detection value is input to the subtractor 304 as a velocity feedback. The velocity detection value is integrated with the integrator 307 so as to be a position detection value, and the position detection value is input to the subtractor 301 as a position feedback.

The velocity feedforward processing unit 308 performs velocity feedforward processing on the position command, and outputs the result of the processing to the adder 306 as the velocity feedforward term. The transfer function of the velocity feedforward processing unit 308 is a transfer function $F(s)$ which is represented by Expression 1 (hereinafter represented as mathematical 1). The optimum values of the coefficients $a_i$ and $b_j$ ($0 \le i \le m$, $0 \le i \le n$, m and n are natural numbers) in Expression 1 are machine learned in the machine learning device 100.

$$F(s) = \frac{b_0 + b_1 s + b_2 s^2 + \cdots + b_n s^n}{a_0 + a_1 s + a_2 s^2 + \cdots + a_m s^m} \qquad [\text{Math. 1}]$$

The position feedforward processing unit 309 differentiates the position command value and multiplies the resulting value by a constant α, and outputs the result of the processing thereof to the adder 303 as the position feedforward term. As described above, the servo control device 300 is configured. The machine learning device 100 will then be described.

The machine learning device 100 executes the preset machining program (hereinafter also referred to as the "learning machining program") so as to learn the coefficients in the transfer function of the velocity feedforward processing unit 308. Here, a machining shape specified by the learning machining program is, for example, an octagon or a shape in which the corners of an octagon are alternately replaced with arcs. The machining shape specified by the learning machining program is not limited to these machining shapes, and may be another machining shape.

Figure 3:
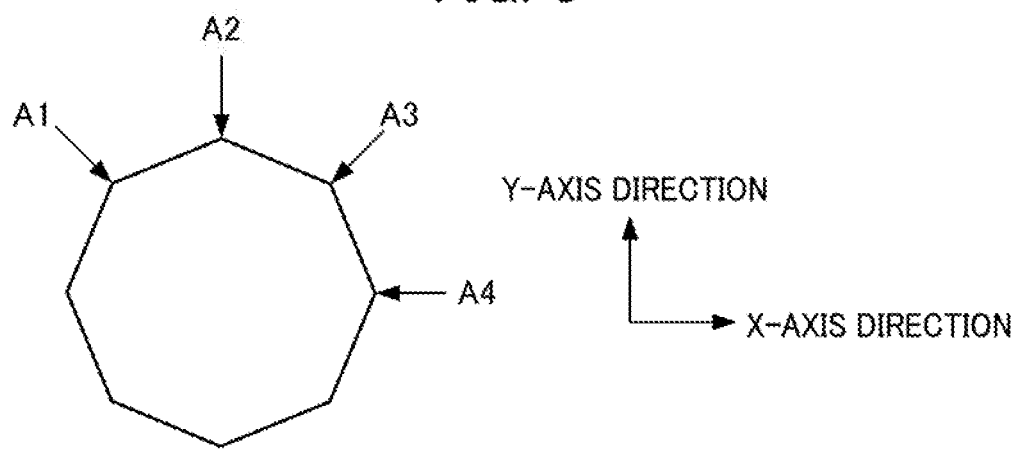
FIG. 3 is a diagram for illustrating an operation of motors when a machining shape is an octagon.
Figure 4:
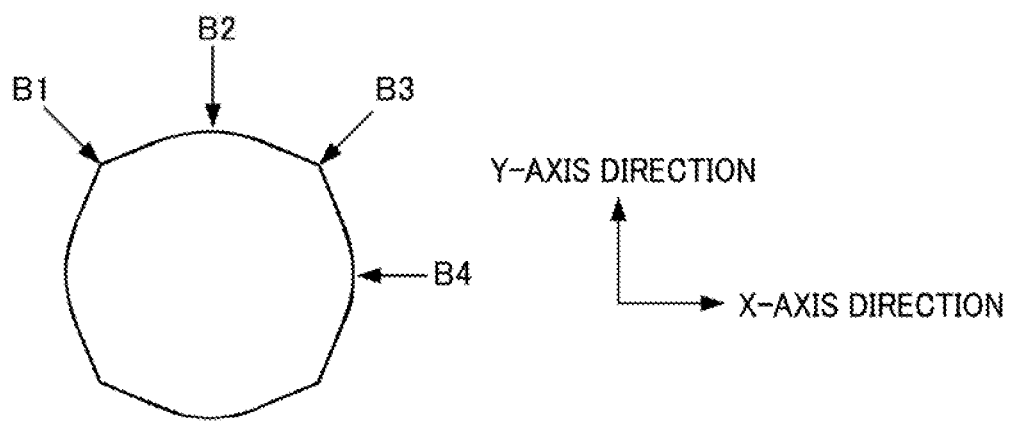
FIG. 4 is a diagram for illustrating the operation of the motors when the machining shape is the shape in which the corners of an octagon are alternatively replaced with arcs.

FIG. 3 is a diagram for illustrating the operation of motors when the machining shape is an octagon. FIG. 4 is a diagram for illustrating the operation of the motors when the machining shape is the shape in which the corners of an octagon are alternately replaced with arcs. In FIGS. 3 and 4, it is assumed that the table is moved in the X-axis direction and the Y-axis direction such that the workpiece (work) is machined clockwise.

When the machining shape is an octagon, as shown in FIG. 3, in the corner position A1, the rotation velocity of the motor which moves the table in the Y-axis direction is decreased, and the rotation velocity of the motor which moves the table in the X-axis direction is increased. In the corner position A2, the rotation direction of the motor which moves the table in the Y-axis direction is reversed, and the motor which moves the table in the X-axis direction is rotated from the position A1 to the position A2 and from the position A2 to the position A3 in the same rotation direction and at constant velocity. In the corner position A3, the rotation velocity of the motor which moves the table in the Y-axis direction is increased, and the rotation velocity of the motor which moves the table in the X-axis direction is decreased. In the corner position A4, the rotation direction of the motor which moves the table in the X-axis direction is reversed, and the motor which moves the table in the Y-axis direction is rotated from the position A3 to the position A4 and from the position A4 to the next corner position in the same rotation direction and at constant velocity.

Figure 12:
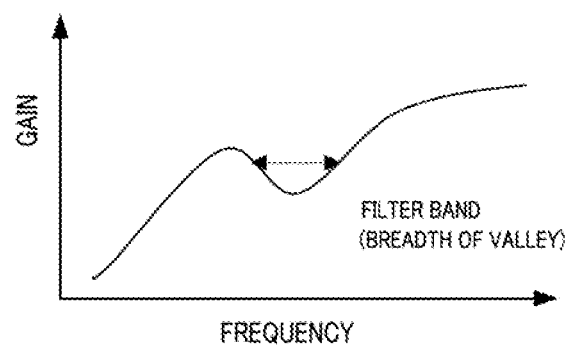
FIG. 12 is a frequency-gain characteristic chart which is intended to illustrate a filter band and which shows the depth of the valley of the curve.

When the machining shape is the shape in which the corners of an octagon are alternately replaced with arcs, as shown in FIG. 4, in the corner position B1, the rotation velocity of the motor which moves the table in the Y-axis direction is decreased, and the rotation velocity of the motor which moves the table in the X-axis direction is increased. In the arc position B2, the rotation direction of the motor which moves the table in the Y-axis direction is reversed, and the motor which moves the table in the X-axis direction is rotated from the position B1 to the position B3 in the same rotation direction and at constant velocity. Unlike the case where the machining shape shown in FIG. 12 is an octagon, the motor which moves the table in the Y-axis direction is gradually reduced in velocity toward the position B2 such that the machining shape of the arc is formed around the position B2, is stopped in rotation in the position B2 and is gradually increased in the rotation velocity the position B2.

In the corner position B3, the rotation velocity of the motor which moves the table in the Y-axis direction is increased, and the rotation velocity of the motor which moves the table in the X-axis direction is decreased. In the arc position B4, the rotation direction of the motor which moves the table in the X-axis direction is reversed, and the table is moved so as to be linearly reversed in the X-axis direction. The motor which moves the table in the Y-axis direction is rotated from the position B3 to the position B4 and from the position 34 to the next corner position in the same rotation direction and at constant velocity. The motor which moves the table in the X-axis direction is gradually reduced in velocity toward the position B4 such that the machining shape of the arc is formed around the position B4, is stopped in rotation in the position B4 and is gradually increased in the rotation velocity past the position B4.

In the present embodiment, as described above, vibration is evaluated when the rotation velocity is changed between the position A1 and the position A3 and between the position B1 and the position B3 in the linear control device of the machining shape specified by the learning machining program, an influence on the position error is checked and thus the machine learning on the optimization of the coefficients in the transfer function of the velocity feedforward processing unit 308 is performed. Although this method is not used in the present embodiment, coasting (operation by inertia) produced when the rotation direction is reversed between the position A2 and the position A4 and between the position B2 and the position B4 of the machining shape is evaluated, and thus an influence on the position error can also be checked. The machine learning on the optimization of the coefficients in the transfer function is not particularly limited to the velocity feedforward processing unit, and can also be applied to, for example, the position feedforward processing unit or to a current feedforward processing unit which is provided when current feedforward on the servo control device is performed.

The machine learning device 100 will then be described in further detail. Although in the following discussion, a case where the machine learning device 100 performs reinforcement learning will be described, the learning performed by the machine learning device 100 is not particularly limited to the reinforcement learning, and the present invention can also be applied to, for example, a case where supervised learning is performed Before the description of individual function blocks included in the machine learning device 100, the basic mechanism of the reinforcement learning will first be described. An agent (which corresponds to the machine learning device 100 in the present embodiment) observes the state of an environment, and selects a certain action, and thus the environment is changed based on the action. As the environment is changed, any reward is provided, and thus the agent learns the selection (decision) of a better action. While the supervised learning indicates a perfect answer, the reward in the reinforcement learning is often a fragmentary value based on the change of part of the environment. Hence, the agent performs learning so as to select such an action that the total of rewards in the future is maximized.

In this way, in the reinforcement learning, the action is learned, and thus a method is learned of learning an appropriate action with consideration given to a mutual effect provided by the action to the environment, that is, a method is learned of performing learning for maximizing rewards obtained in the future. In the present embodiment, for example, this indicates that action information for reducing the position error is selected, that is, that an action affecting the future can be acquired.

Although here, as the reinforcement learning, an arbitrary learning method can be used, in the following discussion, a case where Q-learning which is a method of learning a value Q (S, A) of selecting an action A is used under the state S of a certain environment will be described as an example. An objective of the Q-learning is to select, among actions A which can be taken in a certain state S, an action A whose value Q (S, A) is the highest as an optimum action.

However, when the Q-learning is first started, in a combination of the state S and the action A, a proper value of the value Q (S, A) is not found at all. Hence, the agent selects various actions A under the certain state S, and selects a better action based on a reward provided for the action A at that time so as to learn the proper value Q (S, A).

Since the total of rewards which can be obtained in the future is desired to be maximized, the final aim is to achieve $Q(S, A)=E[\Sigma(\gamma^t)r_t]$. Here E[ ] represents an expected value, t represents time, γ represents a parameter called a discount rate which will be described later, $r_t$ represents a reward at the time t and Σ represents a total at the time t. The expected value in this formula is an expected value when the state is changed according to the optimum action. However, since in the process of the Q-learning, it is not clear what the optimum action is, various actions are performed, and thus the reinforcement learning is performed while a search is being conducted. The formula for updating the value Q (S, A) as described above can be represented by, for example, Expression 2 below (hereinafter represented as mathematical 2).

[Math. 2]

$$Q(S_{t+1}, A_{t+1}) \leftarrow Q(S_t, A_t) + \alpha(r_{t+1} + \gamma \max_A Q(S_{t+1}, A) - Q(S_t, A_t))$$

In Expression 2 described above, $S_t$ represents the state of the environment at the time t, and $A_t$ represents an action at the time t. The state is changed into $S_{t+1}$ by the action $A_t$. $r_{t+1}$ represents a reward which can be obtained by the change of the state. A term including max is obtained by multiplying a Q value when an action A whose Q value is the highest at that time under the state $S_{t+1}$ is selected by γ. Here, γ is a parameter of 0<γ≤1, and is called the discount rate, α is a learning coefficient and is assumed to fall within a range of 0<α≤1.

The Expression 2 described above indicates a method of updating the value Q ($S_t$, $A_t$) of the action $A_t$ in the state $S_t$ based on the reward $r_{t+1}$ which is returned as a result of a trial $A_t$. This updating formula indicates that when the value $\max_a$ Q ($S_{t+1}$, A) of the best action in the subsequent state $S_{t+1}$ by the action $A_t$ is higher than the value Q ($S_t$, $A_t$) of the action $A_t$ in the state $S_t$, Q ($S_t$, $A_t$) is increased whereas when the value $\max_a$ Q ($S_{t+1}$, A) is lower than the value Q ($S_t$, $A_t$), Q ($S_t$, $A_t$) is decreased. In other words, the value of a certain action in a certain state is brought close to the value of the best action in the subsequent state resulting therefrom. Although the difference thereof is changed according to the discount rate γ and the reward $r_{t+1}$, a mechanism is formed such that the value of the best action in a certain state is basically propagated to the value of the action in the preceding state.

Here, in the Q-learning, there is a method in which a table of Q (S, A) for all state action pairs (S, A) is produced and in which thus learning is performed. However, it is likely that since a large number of states are present so that the values of Q (S, A) for all state action pairs are determined, it takes much time to conclude the Q-learning.

Hence, a known technology called DQN (Deep Q-Network) may be utilized. Specifically, a value function Q is configured with an appropriate neural network, a parameter for the neural network is adjusted and thus the value function Q is approximated with the appropriate neural network, with the result that the value of the value Q (S, A) may be calculated. By the utilization of the DQN, it is possible to reduce the time necessary for the conclusion of the Q-learning. On the DQN, for example, a non-patent, document below discloses the details thereof.

Non-Patent Document

"Human-level control through deep reinforcement learning", written by Volodymyr Mnihl [online], [search on Jan. 17, 2017], Internet <URL: http://files.davidqiu.com/research/nature14236.pdf>

The Q-learning described above is performed by the machine learning device 100. Specifically, the machine learning device 100 learns the value Q in which in the servo control device 300, a servo state of commands, feedback and the like including the values of the individual coefficients $a_i$ and $b_j$ (0≤i≤m, 0≤j≤n, m and n are natural numbers) in the transfer function of the velocity feedforward processing unit 308, the position error of the servo control device 300 acquired by the execution of the learning machining program and the position command is assumed to fee the state S and in which the adjustment of the values of the individual coefficients $a_i$ and $b_j$ in the transfer function of the velocity feedforward processing unit 308 in the state S is selected as the action A.

The machine learning device 100 executes, based on the individual coefficients $a_i$ and $b_j$ in the transfer function of the velocity feedforward processing unit 308, the learning machining program, and thereby observes, between the position A1 and the position A3 and between the position B1 and the position B3 in the machining shapes described above, state information S including the servo state of commands, feedback and the like including the position command and the position error information of the servo control device 300 so as to determine the action A. In the machine learning device 100, each time the action A is performed, a reward is returned. For example, the machine learning device 100 searches the optimum action A in a trial and error manner such that the total of rewards in the future is maximized. In this way, the machine learning device 100 can select the optimum action A (that is, the optimum coefficients $a_i$ and $b_j$ in the velocity feedforward processing unit 308) for the state S including the servo state of commands, feedback and the like including the position command and the position error of the servo control device 300 acquired by the execution of the learning machining program based on the individual coefficients $a_i$ and $b_j$ in the transfer function of the velocity feedforward processing unit 308. Between the position A1 and the position A3 and between the position B1 and the position B3, the rotation directions of the servo motors for the X-axis direction and the Y-axis direction are not changed, and thus the machine learning device 100 can learn the individual coefficients $a_i$ and $b_j$ in the transfer function of the velocity feedforward processing unit 308 when a linear operation is performed.

In other words, based on the value function Q learned by the machine learning device 100, among the actions A applied to the individual coefficients $a_i$ and $b_j$ in the transfer function of the velocity feedforward processing unit 303 in the certain state S, such an action A as to maximize the value of Q is selected, and thus it is possible to select such an action A (that is, the individual coefficients $a_i$ and $b_j$ in the transfer function of the velocity feedforward processing unit 308) as to minimize the position error acquired by the execution of the learning machining program.

Figure 5:
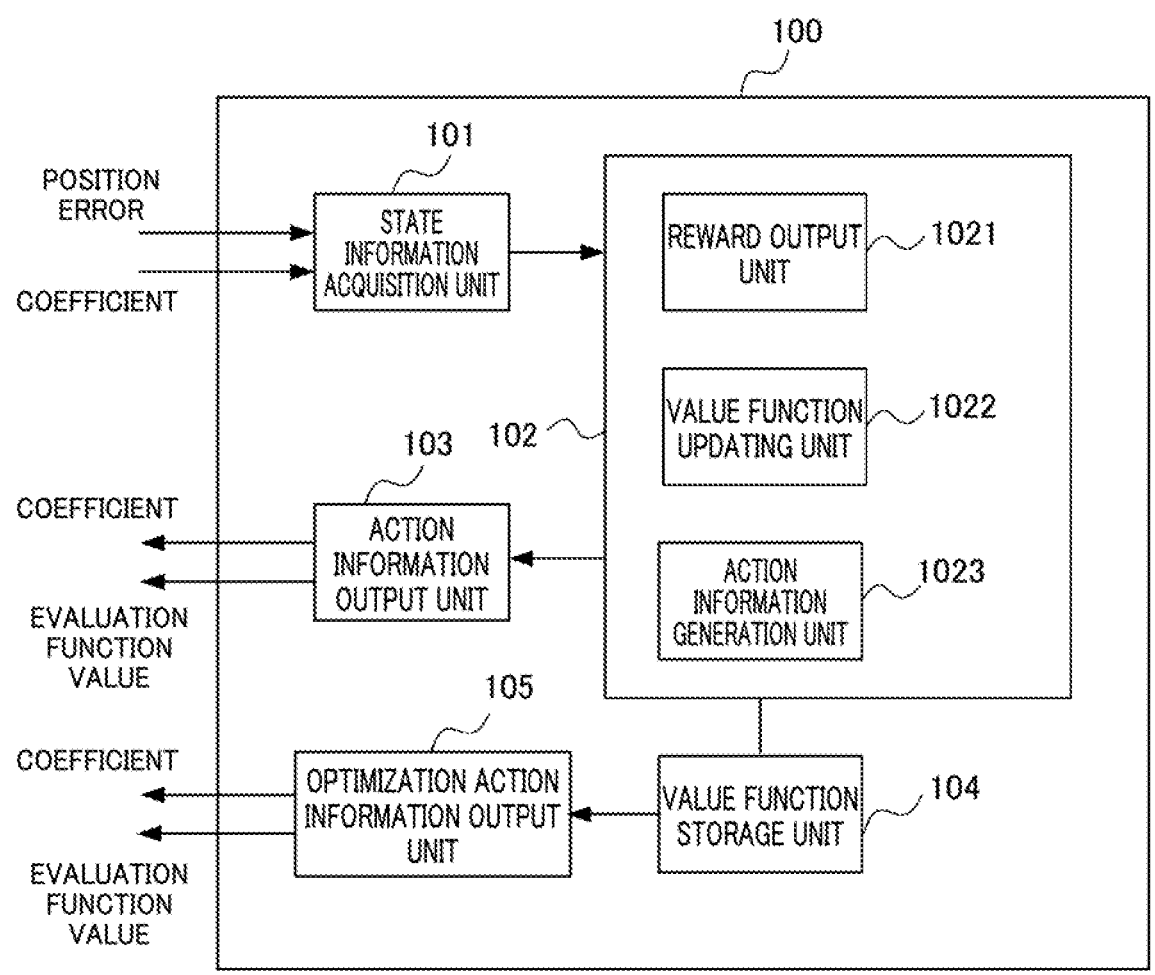
FIG. 5 is a block diagram showing a machine learning device according to the first embodiment of the present invention.

FIG. 5 is a block diagram showing the machine learning device 100 according to the first embodiment of the present invention. In order to perform the reinforcement learning described above, as shown in FIG. 5, the machine learning device 100 includes a state information acquisition unit 101, a learning unit 102, an action information output unit 103, a value function storage unit 104 and an optimization action information output unit 105. The learning unit 102 includes a reward output unit 1021, a value function updating unit 1022 and an action information generation unit 1023.

The state information acquisition unit 101 acquires, from the servo control device 300, the state S including the servo state of commands, feedback and the like including the position command and the position error of the servo control device 300 acquired by the execution of the learning machining program based on the individual coefficients $a_i$ and $b_j$ in the transfer function of the velocity feedforward processing unit 308 in the servo control device 300. The state information S corresponds to an environment state S in the Q-learning. The state information acquisition unit 101 outputs the acquired state information S to the learning unit 102.

The coefficients $a_i$ and $b_j$ in the velocity feedforward processing unit 308 when the Q-learning is first started are previously generated by the user. In the present embodiment, the initial setting values of the coefficients $a_i$ and $b_j$ in the velocity feedforward processing unit 303 which are produced by the user are adjusted so as to be the optimum ones by the reinforcement learning. For example, the initial setting values of the coefficients $a_i$ and $b_j$ in the velocity feedforward processing unit 308 are set to $a_0=1$, $a_1=0$, $a_2=0$, ..., $a_m=0$, $b_0=1$, $b_1=0$, $b_2=0$, ... and $b_n=0$ in Expression 1. The orders m and n of the coefficients $a_i$ and $b_j$ are previously set. Specifically, it is assumed that $0 \le i \le m$ holds true for $a_i$ and $0 \le j \le n$ holds true for $b_j$. With respect to the coefficients $a_i$ and $b_j$, when the machine tool is previously adjusted by the operator, machine learning may be performed by using, as initial values, values which have been adjusted.

The learning unit 102 is a unit which learns the value Q (S, A) when a certain action A is selected under a certain environment state S.

The reward output unit 1021 is a unit which calculates a reward when the action A is selected under the certain state S. Here, the set. (position error set) of the position error that is a state variable in the state S is represented by PD(S), and a position error set that is a state variable related to state information S' into which the state S is changed by the action information A (correction of the individual coefficients $a_i$ and $b_j$ in the velocity feedforward processing unit 308) is represented by PD(S'). The position error value in the state S is assumed to be a value which is calculated based on a preset evaluation function f (PD(S)). For example, when the position error is represented by e, to the evaluation function f, the following functions can be applied:

a function for calculating an integrated value of absolute values of position errors;
$\int |e|dt$
a function for calculating an integrated value by weighting to absolute values of position errors;
$\int t|e|dt$
a function for calculating an integrated value of 2n-th power (n is a natural number) of absolute values of position errors; and
$\int e^{2n}dt$ (n is a natural number)
a function for calculating the maximum value of absolute values of position errors
Max $\{|e|\}$.

Here, when the evaluation function value f (FD(S')) of the position error in the servo control device 300 which is operated based on the velocity feedforward processing unit 308 that is related to the state information S' corrected with the action information A and that has been corrected is greater than the evaluation function value f (PD(S)) of the position error in the servo control device 300 which is operated based on the velocity feedforward processing unit 308 that is related to the state information S before being corrected with the action information A and that is before being corrected, the reward output unit 1021 sets the value of a reward to a negative value.

On the other hand, when the evaluation function value f (PD(S')) of the position error is smaller than the evaluation function value f (PD(S)) of the position error, the reward output unit 1021 sets the value of a reward to a positive value. When the evaluation function value f (PD(S')) of the position error is equal to the evaluation function value f (PD(S)) of the position error, the reward output unit 1021 sets the value of a reward to zero.

The negative value when the evaluation function value f (PD(S')) of the position error in the state S' after the action A is performed is greater than the evaluation function value f (PD(S)) of the position error in the previous state S may be increased according to a ratio. In other words, the negative value is preferably increased according to the degree to which the position error value is increased. By contrast, the positive value when the evaluation function value f (PD(S')) of the position error in the state S' after the action A is performed is smaller than the evaluation function value f (PD(S)) of the position error in the previous state S may be increased according to a ratio. In other words, the positive value is preferably increased according to the degree to which the position error value is decreased.

The value function updating unit 1022 performs the Q-learning based on the state S, the action A, the state S' when the action A is applied to the state S and the value of a reward calculated as described above so as to update the value function Q stored in the value function storage unit 104. The updating of the value function Q may be performed by online learning, may be performed by batch learning or may be performed by mini-batch learning. The online learning is a learning method in which a certain action A is applied to the current state S, and in which thus each time the state S is changed to the new state S', the value function Q is immediately updated. The batch learning is a learning method in which a certain action A is applied to the current state S, and in which thus the state S is repeatedly changed to the new state S' such that data for the learning is collected and that all the data for the learning which is collected is used so as to update the value function Q. Furthermore, the mini-batch learning is an intermediate learning method between the online learning and the batch learning in which each time a certain amount of data for the learning is stored, the value function Q is updated.

The action information generation unit 1023 selects the action A in the process of the Q-learning for the current state S. The action information generation unit 1023 generates, in the process of the Q-learning, the action information A for performing an operation (which corresponds to the action A in the Q-learning) of correcting the individual coefficients $a_i$ and $b_j$ in the velocity feedforward processing unit 308 of the servo control device 300, and outputs the generated action information A to the action information output unit 103. More specifically, for example, the action information generation unit 1023 incrementally (for example, about 0.01) adds or subtracts the individual coefficients $a_i$ and $b_j$ in the velocity feedforward processing unit 308 included in the action A to or from the individual coefficients in the velocity feedforward processing unit included in the state S.

Then, when the action information generation unit 1023 applies the increase or the decrease in the individual coefficients $a_i$ end $b_j$ in the velocity feedforward processing unit 308, the state is changed to the state S' and a plus reward (positive reward) is returned, the action information generation unit 1023 may select the subsequent action A' such as for incrementally performing addition or subtraction on the individual coefficients $a_i$ and $b_j$ in the velocity feedforward processing unit 308 in the same manner as the preceding action such that the value of the position error is more decreased.

By contrast, when a minus reward (negative reward) is returned, the action information generation unit 1023 may select the subsequent action A' such as for incrementally performing subtraction or addition on the individual coefficients $a_i$ and $b_j$ in the velocity feedforward processing unit in a manner opposite to the preceding action such that the position error is smaller than the preceding value.

The action information generation unit 1023 may select the action A' by a known method such as a greedy method of selecting the action A' whose value Q (S, A) is the highest in the value of the action A that is currently estimated or an ε greedy method of randomly selecting the action A' with a small probability ε and otherwise selecting the action A' whose value Q (S, A) is the highest.

The action information output unit 103 is a unit which outputs, to the output device 200, the action information A and the evaluation function value output from the learning unit 102. As described previously, the servo control device 300 slightly corrects, through the output device 200, based on the action information, the current state S, that is, the currently set individual coefficients $a_i$ and $b_j$ in the velocity feedforward processing unit 303 which are currently set so as to change the state to the subsequent state S' (that is, the corrected individual coefficients in the velocity feedforward processing unit 308).

The value function storage unit 104 is a storage device which stores the value function Q. The value function Q may be stored, for example, for each state S or each action A, in a table (hereinafter referred to as an action value table). The value function Q stored in the value function storage unit 104 is updated with the value function updating unit 1022. The value function Q stored in the value function storage unit 104 may be shared with another machine learning device 100. When the value function Q is shared between a plurality of machine learning devices 100, the reinforcement learning can be dispersedly performed in the individual machine learning devices 100, and thus the efficiency of the reinforcement learning can be enhanced.

The optimization action information output unit 105 generates, based on the value function Q which is updated as a result of the value function updating unit 1022 performing the Q-learning, the action information A (hereinafter referred to as "optimization action information") for making the velocity feedforward processing unit 308 perform an operation of maximizing the value Q (S, A). More specifically, the optimization action information output unit 105 acquires the value function q stored in the value function storage unit 104. As described above, this value function Q is updated as a result of the value function updating unit 1022 performing the Q-learning. Then, the optimization action information output unit 105 generates the action information based on the value function Q, and outputs the generated action information to the output device 200. In the optimization action information described above, as with the action information output by the action information output unit 103 in the process of the Q-learning, information for correcting the individual coefficients $a_i$ and $b_j$ in the velocity feedforward processing unit 308 and the evaluation function value are included.

As described above, the machine learning device 100 according to the present embodiment is utilized, and thus it is possible to simplify the parameter adjustment on the velocity feedforward processing unit 308 of the servo control device 300.

In the calculation of the value of the reward, the reward output unit 1021 may add another element other than the position error. For example, in addition to the position error serving as the output of the subtractor 301, the reward output unit 1021 may add at least one of a position-forward-controlled velocity command which serves as the output of the adder 303, a difference between the position-forward-controlled velocity command and velocity feedback which serves as the output of the subtractor 304, a velocity-forward-controlled torque command which serves as the output of the adder 306 and the like so as to calculate the value of the reward.

In the embodiment discussed above, the learning on the optimization of the coefficients in the velocity feedforward processing unit at the time of the linear operation in which the rotation directions of the servo motors for the X-axis direction and the Y-axis direction are not changed in the machine learning device 100 is described. However, the present embodiment is not limited to the learning at the time of the linear operation, and can also be applied to learning on non-linear operation. For example, when the learning on the optimization of the coefficients in the velocity feedforward processing unit is performed for backlash correction, a difference between the position command value and the detection position output from an integrator 108 between the position A2 and the position A4 and between the position B2 and the position B4 in the machining shape described previously is extracted as the position error, this position error is used as determination information and thus a reward is given, with the result that the reinforcement learning can be performed. Between the position A2 and the position A4 and between the position B2 and the position B4, the rotation directions of the servo motors for the Y-axis direction or the X-axis direction are reversed, a non-linear operation is performed and thus a backlash is produced, with the result that the 100 can perform the learning on the coefficients in the transfer function of the feedforward processing unit at the time of the non-linear operation. The servo control device 300 and the machine learning device 100 have been described above. The output device 200 will then be described.

<Output Device 200>

Figure 6:
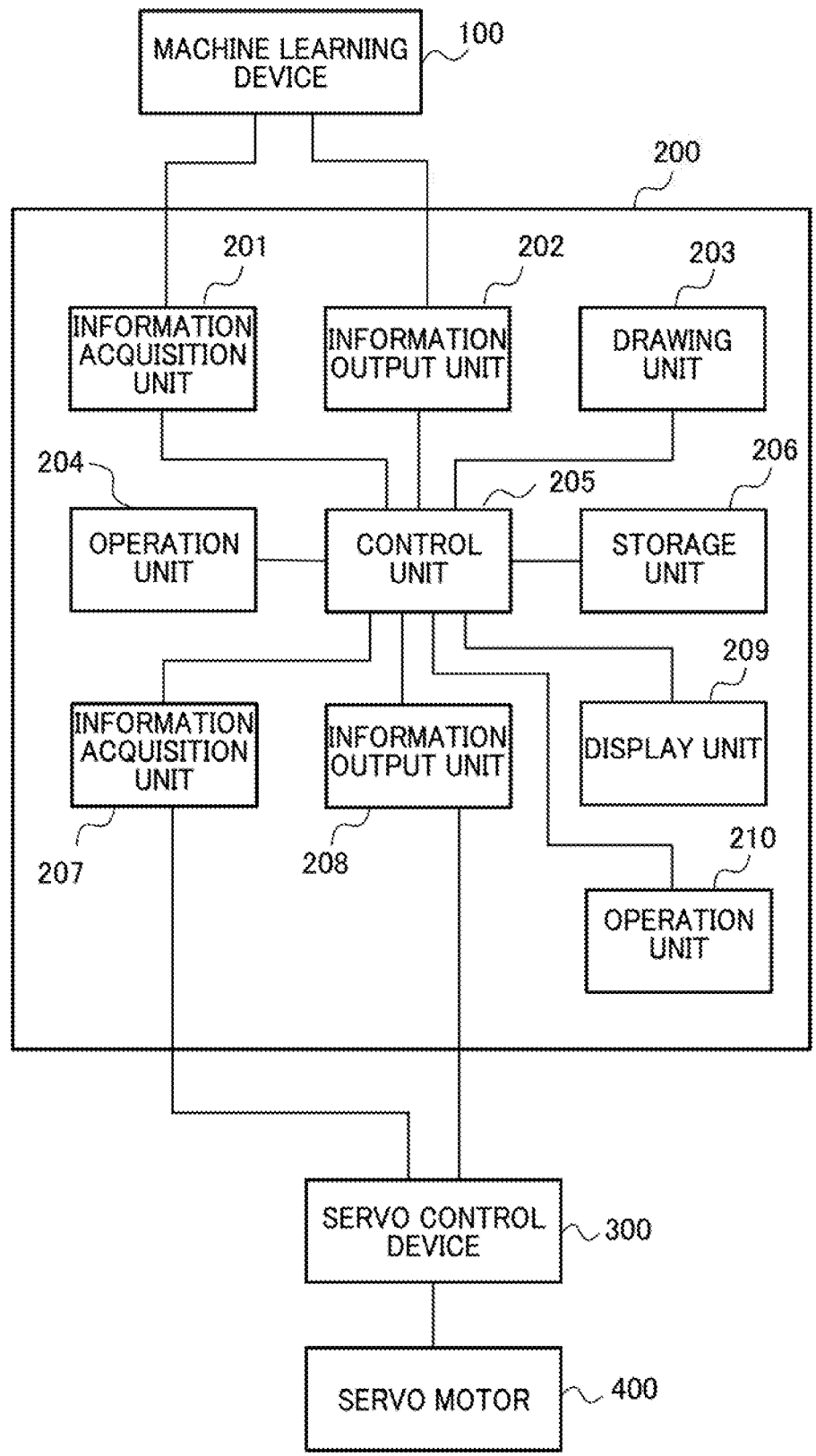
FIG. 6 is a block diagram showing an example of the configuration of an output device included in the control device according to the first embodiment of the present invention.

FIG. 6 is a block diagram showing an example of the configuration of the output device 200 included in the control device 10 according to the first embodiment of the present invention. As shown in FIG. 6, the output device 200 includes an information acquisition unit 201, an information output unit 202, a drawing unit 203, an operation unit 204, a control unit 205, a storage unit 206, an information acquisition unit 207, an information output unit 203, a display unit 209 and an operation unit 210.

The information acquisition unit 201 serves as an information acquisition unit which acquires the parameters and the evaluation function value from the machine learning device 100. The control unit 205 and the display unit 209 serve as an output unit which outputs, with a scatter chart or the like, a relationship between the parameters (for example, the coefficients $a_i$ and $b_j$ in the velocity feedforward processing unit) or values (for example, the center frequency, the bandwidth fw and the attenuation coefficient (damping)) calculated from the parameters and the evaluation function value. As the display unit 209 of the output unit, a liquid crystal display device, a printer or the like can be used. The output includes storage in the storage unit 206, and in such a case, the output unit is the control unit 205 and the storage unit 206.

The output device 200 has an output function of outputting a relationship between the parameters (learning parameters) in the machine learning device 100 that are being machine learned or have been machine learned and the evaluation function value or a relationship between the values calculated from the learning parameters and the evaluation function value. The output device 200 also has a relay function of relaying information (for example, the control commands such as the position command and the velocity command, the position error and the coefficients in the velocity feedforward processing unit) from the serve control device 300 to the machine learning device 100 and information (for example, the correction information of the coefficients in the velocity feedforward processing unit) from the machine learning device 100 to the servo control device 310 and an adjustment function of performing the control (for example, an instruction to start up the learning program to the machine learning device and an instruction to change the search range) on the operation of the machine learning device 100. The relay of the information and the control on the operation are performed through the information acquisition units 201 and 207 and the information output units 202 and 208.

Figure 7:
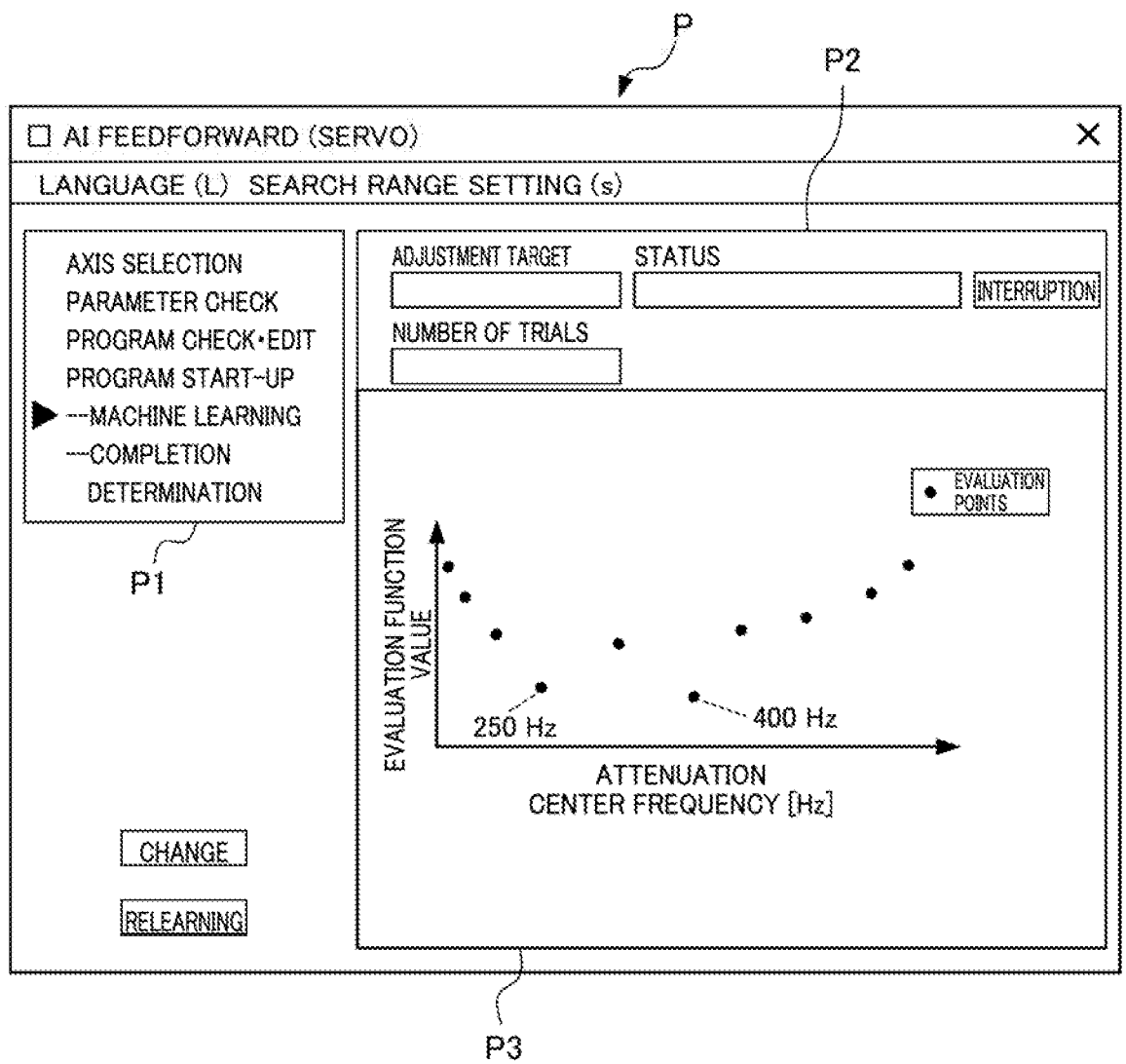
FIG. 7 is a diagram showing an example of a display screen when a characteristic chart showing a relationship between a filter attenuation center frequency and an evaluation function value calculated from parameters related to a state S is displayed in a display unit so as to correspond to the progress of machine learning while the machine learning is being performed.

A case where the output device 200 outputs the relationship between the values calculated from the parameters which are being machine learned and the evaluation function value will first be described with reference to FIG. 7. FIG. 7 is a diagram showing an example of the display screen when a scatter chart or the like showing the relationship between the attenuation center frequency and the evaluation function value calculated from the parameters related to the state S is displayed in the display unit 209 so as to correspond to the progress of the machine learning while the machine learning is being performed. As shown in FIG. 7, the display screen P of the display unit 209 includes columns P1, P2 and P3. In the column P1, the display unit 209 displays, for example, selection items of axis selection, parameter check, program check•edit, program start-up, being machine learned and completion determination. In the column P2, the display unit 209 displays, for example, an adjustment target such as the velocity feedforward, a status (state) such as data being collected, the number of trials indicating the total number of trials up to the present time with respect to the preset number of trials (hereinafter also referred to as the "maximum number of trials") up to the completion of the machine learning and a button for selecting the interruption of the learning. In the column P3, the display unit 209 displays, for example, a scatter chart showing the relationship between the attenuation center frequency fc and the evaluation function value which are the values calculated from the coefficients in the transfer function of the velocity feedforward processing unit.

When the user such as the operator selects, with the operation unit 204 such as a mouse or a keyboard, the "machine learning" in the column P1 on the display screen P shown in FIG. 7 in the display unit 209 such as a liquid crystal display device, the control unit 205 feeds, through the information output unit 202, to the machine learning device 100, an instruction to output the coefficients $a_i$ and $b_j$ related to the state S associated with the number of trials, the evaluation function value f (PD(S)), information on the adjustment target (learning target) of the machine learning, the number of trials, information including the maximum number of trials and the like.

When the information acquisition unit 201 receives, from the machine learning device 100, the coefficients $a_i$ and $b_j$ related to the state S associated with the number of trials, the evaluation function value f (PD(S)), the information on the adjustment target (learning target) of the machine learning, the number of trials, the information including the maximum number of trials and the like, the control unit 205 stores the received information in the storage unit 206, and transfers control to the operation unit 210. In the storage unit 206, the coefficients $a_i$ and $b_j$ and the evaluation function value f(PS(S)) corresponding to the coefficients $a_i$ and $b_j$ are stored so as to be associated.

The operation unit 210 calculates, from the parameters which are being machine learned in the machine learning device 100, specifically, the parameters (for example, the above-described coefficients $a_i$ and $b_j$ related to the state S) at the time of the reinforcement learning or after the reinforcement learning, the attenuation center frequency fc of the velocity feedforward processing unit. The attenuation center frequency fc is a value (second physical quantity) which is calculated from $a_i$ and $b_j$. The operation unit 210 can calculate, in addition to the attenuation center frequency fc, the bandwidth fw and the attenuation coefficient R. In the following discussion, a method of calculating the attenuation center frequency fc, the bandwidth fw and the attenuation coefficient R will be described.

The method in which the operation unit 210 calculates the attenuation center frequency fc, the bandwidth fw and the attenuation coefficient R will be described below using, as an example, a case where the velocity feedforward processing unit 308 is indicated by the motor reverse characteristic (transfer function is $Js^2$) and the notch filter. When the velocity feedforward processing unit 308 is indicated by the motor reverse characteristic (transfer function is $Js^2$) and the notch filter, the transfer function F(s) represented by Expression 1 is an expression model indicated by the right side of Expression 3, and is indicated as the right side of Expression 3 by use of the center angle frequency ω, the fractional bandwidth ζ and the attenuation coefficient R. In order to determine the attenuation center frequency fc, the bandwidth fw and the attenuation coefficient (damping) R from the coefficients $a_i$ and $b_j$, a center angle frequency ω, a fractional bandwidth ζ and the attenuation coefficient R are determined from Expression 3, and the center frequency fc and the bandwidth fw are further determined from ω=2πfc and ζ=fw/fc.

$$\frac{b_2 s^2 + b_3 s^3 + b_4 s^4}{a_0 + a_1 s + a_2 s^2} = Js^2 \cdot \frac{\omega^2 + 2R\zeta\omega s + s^2}{\omega^2 + 2\zeta\omega s + s^2} \qquad \text{[Math. 3]}$$

Since it holds true from Expression 3 that $a_0=\omega^2$, $b^4=J$, $a_1=2\zeta\omega$, $b_3=2J\zeta R\omega$ and $(b_3/a_1)=R\cdot J$ and $\omega=2\pi fc$ and $\zeta=fw/fc$, the center frequency fc, the bandwidth fw and the attenuation coefficient R can be determined by Expression 4.

$$f_c = \frac{\sqrt{a_0}}{2\pi}, \; f_w = \frac{a_1}{4\pi}, \; R = \frac{b_3}{a_1 \cdot b_4} \qquad \text{[Math. 4]}$$

Although in the above description, the case where when the velocity feedforward processing unit 308 is indicated by the mathematical formula model of the motor reverse characteristic (transfer function is $Js^2$) and the notch filter, the attenuation center frequency fc, the bandwidth fw and the attenuation coefficient R are calculated is used as an example, the present embodiment is not particularly limited to such a case, and even when the transfer function of the velocity feedforward processing unit 308 is in the form of a general formula as indicated in Expression 1, if the transfer function has the valley of a gain, the attenuation center frequency fc, the bandwidth fw and the attenuation coefficient R can be determined. In general, no matter how high the order of the filter is, it is likewise possible to determine one or more of the attenuation center frequency fc, the bandwidth fw and the attenuation coefficient R which are attenuated. Software which can analyse the frequency response from the transfer function is known, and, for example, the followings can be used:

https://jp.mathworks.com/help/signal/ug/frequency-renponse.html;
https://jp.mathworks.com/help/signal/ref/freqz.html;
https://docs.scipy.org/doc/scipy-0.19.1/reference/generated/scipy.signal.freqz.html;
https://wiki.octave.org/Control_package;

and the like. The attenuation center frequency fc, the bandwidth fw and the attenuation coefficient R can be determined from the frequency response.

The operation unit 210 calculates the attenuation center frequency fc, and then transfers control to the control unit 205. The transfer function in the right side of Expression 3 is transformed into the transfer function of the velocity feedforward processing unit 308 which is indicated by the center frequency fc, the bandwidth fw and the attenuation coefficient R, and the parameters of the center frequency fc, the bandwidth fw and the attenuation coefficient R are machine learned in the machine learning device 100, with the result that the output device 200 may acquire the center frequency fc, the bandwidth fw and the attenuation coefficient R which are determined. In this case, the center frequency fc, the bandwidth fw and the attenuation coefficient R which are acquired serve as the first physical quantities.

The control unit 205 stores the attenuation center frequency fc in the storage unit 206. In the storage unit 206, the coefficients $a_i$ and $b_j$ and the evaluation function value f (PD(S)) corresponding to the coefficients $a_i$ and $b_j$ are stored so as to be associated, and the control unit 205 also stores the attenuation center frequency fc calculated based on the coefficients $a_i$ and $b_j$ so as to be associated with the evaluation function value f (PD(S)). The control unit 205 further determines the attenuation center frequency fc in which the evaluation function value has a local minimum value, stores it in the storage unit 206 and transfers control to the drawing unit 203. When the output device 200 does not determine the physical quantities such as the attenuation center frequency fc, and outputs the information indicting the relationship between the velocity feed coefficients $a_i$ and $b_j$ serving as the learning parameters and the evaluation function value, it is not necessary to calculate, with the operation unit 210, the physical quantities such as the attenuation center frequency fc from the velocity feed coefficients $a_i$ and $b_j$, it is not necessary to determine the attenuation center frequency fc and the control unit 205 transfers control to the drawing unit 203. The drawing unit 203 produces an attenuation center frequency-evaluation function value scatter chart of the evaluation function value f (PD(S)) stored so as to be associated with the coefficients $a_i$ and $b_j$ with respect to the attenuation center frequency fc calculated based on the coefficients $a_i$ and $b_j$, adds, to the scatter chart, values (here, 250 Hz and 400 Hz) of the attenuation center frequency fc where the evaluation function value indicates a local minimum value so as to produce the image information of the attenuation center frequency-evaluation function value scatter chart and transfers control to the control unit 205. The control unit 205 displays the attenuation center frequency-evaluation function value scatter chart in the column P3 on the display screen P shown in FIG. 7. The control unit 205 displays "velocity feedforward" in the adjustment target item of the column P2 on the display screen P shown in FIG. 7, for example, based on information indicating that the velocity feedforward processing unit is the adjustment target, and when the number of trials does not reach the maximum number of trials, "data being collected" is displayed in the status item of the column P2. The control unit 205 further displays, in the item of the number of trials in the column P2, a ratio of the number of trials to the maximum number of trials. When the information indicating the relationship between the velocity feed coefficients $a_i$ and $b_j$ and the evaluation function value is output, the drawing unit 203 produces, for example, a scatter chart showing the relationship between the velocity feed coefficient $a_0$ (parameter associated with the attenuation center frequency fc) and the evaluation function value, and the control unit 205 displays the scatter chart in the column P3 on the display screen P shown in FIG. 7.

The display screen P shown in FIG. 7 is an example, and the present invention is not limited to this display screen. Information other than the items illustrated above may be displayed. The display of information of some items illustrated above may be omitted. Although in the above description, the control unit 205 stores information received from the machine learning device 100 in the storage unit 206, and displays, in real time, in the display unit 209, for example, information on the attenuation center frequency-evaluation function value scatter chart, there is no limitation to this configuration. Configuration examples where a display is not produced in real time include the followings. Configuration example 1: When the user such as the operator provides a display instruction, the information shewn in FIG. 7 is displayed. Configuration example 2: When the total number of trials (after the start of the learning) reaches a preset number of trials, the information shown in FIG. 7 is displayed. Configuration example 3: When the machine learning is interrupted or completed, the information shown in FIG. 7 is displayed.

Even in configuration examples 1 to 3 described above, as in the operation of the real-time display described above, when the information acquisition unit 201 receives, from the machine learning device 100, the coefficients $a_i$ and $b_j$ related to the state S associated with the number of trials, the information on the adjustment target (learning target) of the machine learning, the number of trials, the information including the maximum number of trials and the like, the control unit 205 stores the received information in the storage unit 206. Thereafter, the control unit 205 transfers control to the operation unit 210 and the drawing unit 203 when in configuration example 1, the user provides a display instruction, when in configuration example 2, the total number of trials reaches a preset number of trials or when in configuration example 3, the machine learning is interrupted or completed.

Figure 8:
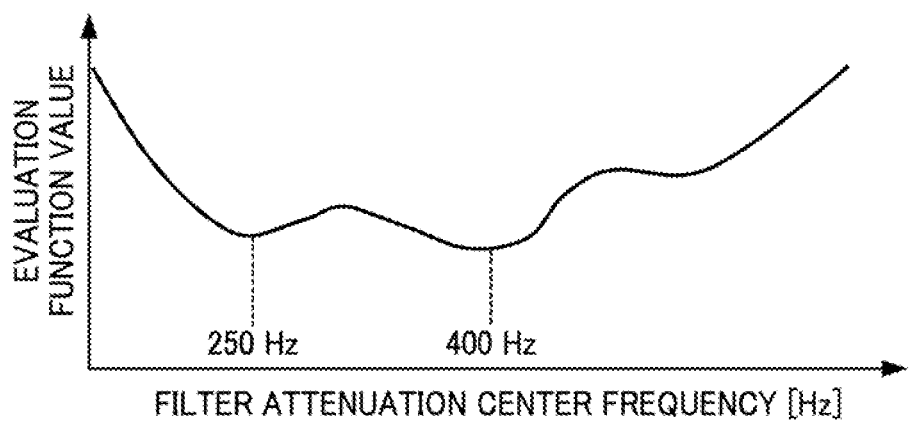
FIG. 8 is a chart showing another example of the characteristic chart which is displayed on the display screen of the display unit in the output device.

The drawing unit 203 may produce, instead of the attenuation center frequency-evaluation function value scatter chart, as shown in FIG. 8, a figure in which the evaluation function value is represented not as evaluation points but as the characteristic chart of an evaluation curve, and the control unit 205 may display the figure shown in FIG. 8 in the column P3 on the display screen P shown in FIG. 7.

Figure 9:
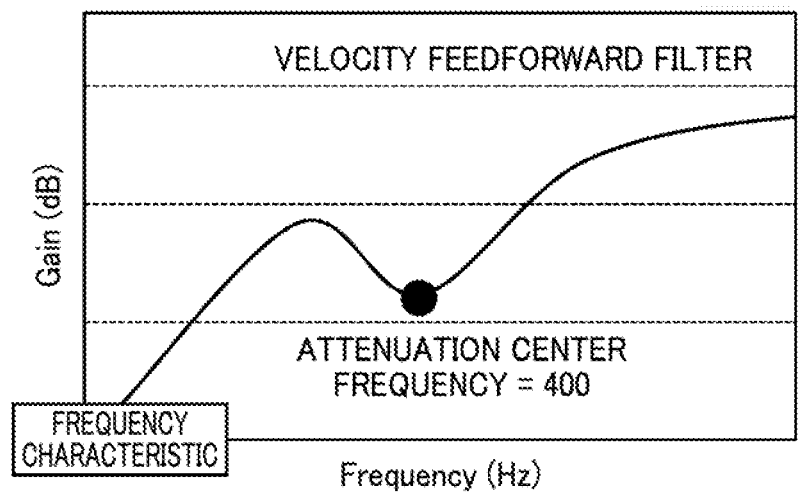
FIG. 9 is a frequency characteristic chart showing a frequency-gain characteristic which is added to the display screen of the display unit in the output device.

Although in the above discussion, the example is described where the attenuation center frequency-evaluation function value scatter chart or the characteristic chart of the evaluation curve is displayed in the column P3 on the display screen P of the display unit 209, a frequency characteristic chart showing the frequency-gain characteristic of the velocity feedforward processing unit 308 may be added to the scatter chart or the characteristic chart. For example, the drawing unit 203 determines, with the operation unit 210, the frequency response of the velocity feedforward processing unit 308 from the transfer function including the center angle frequency ω, the fractional bandwidth ζ and the attenuation coefficient R in the right side of Expression 3, produces a frequency-gain characteristic chart shown in FIG. 9 and transfers control to the control unit 205. The frequency response of the velocity feedforward processing unit 308 can be determined from the transfer function in the right side of Expression 3 with the above-described known software which can analyze a frequency response from a transfer function. The control unit 205 displays, in the column P3 on the display screen P shown in FIG. 7, the frequency-gain characteristic chart (serving as the frequency response characteristic) and the attenuation center frequency-evaluation function value scatter chart or the characteristic chart of the evaluation curve. In this way, the user such as the operator can simultaneously grasp the frequency-gain characteristic of the velocity feedforward processing unit 308. FIG. 9 shows that the attenuation center frequency is 400 Hz.

In the embodiment discussed above, the example is described where the scatter chart or the characteristic chart of the evaluation curve showing the relationship between the attenuation center frequency or the learning parameters and the evaluation function value is displayed in the column P3 on the display screen P of the display unit 209. However, the physical quantity indicating the relationship with the evaluation function value is not limited to the attenuation center frequency, and instead of the attenuation center frequency, the bandwidth fw or the attenuation coefficient R may be used. The bandwidth fw or the attenuation coefficient R may be added to the attenuation center frequency, and in this case, a chart displayed in the column P3 on the display screen P can be a three-dimensional chart (3D graph). An attenuation center frequency-evaluation function value characteristic chart in which the bandwidth fw or the attenuation coefficient R is changed and in which thus a plurality of curves indicating the relationship between the evaluation function value and the attenuation center frequency are provided may be displayed in the column P3 on the display screen P shown in FIG. 7. These examples will be described below as examples 1 to 3. It is needless to say that in individual examples below, the attenuation center frequency, the bandwidth fw and the attenuation coefficient R may be changed to any one of the coefficients $a_i$ and $b_j$ in the transfer function of the velocity feedforward processing unit.

Example 1

Figure 10:
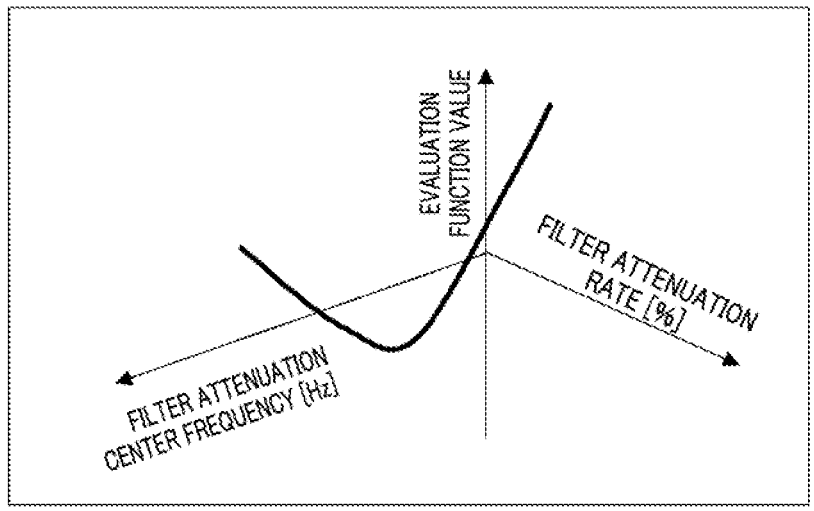
FIG. 10 is a three-dimensional chart showing a relationship between an attenuation center frequency, the evaluation function value and a filter attenuation rate.
Figure 11:
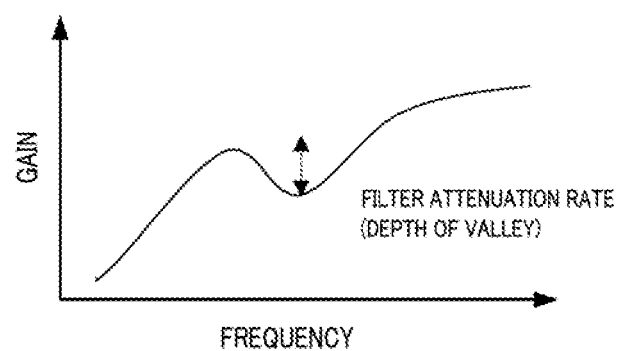
FIG. 11 is a frequency-gain characteristic chart which is intended to illustrate the filter attenuation rate and which shows the depth of the valley of a curve.

The present example 1 is an example where a three-dimensional chart (3D graph) in which a filter attenuation rate (attenuation coefficient (damping)) is added to the attenuation center frequency and the evaluation function value is displayed in the column P3 on the display screen P of the display unit 209. FIG. 10 is a three-dimensional chart showing a relationship between the attenuation center frequency, the evaluation function value and the filter attenuation rate. In FIG. 10, the filter attenuation rate may be replaced with a filter band (bandwidth). As shown in a curve indicating the frequency-gain characteristic of FIG. 11, the filter attenuation rate indicates the depth of the valley of the curve. As shown in a curve indicating the frequency-gain characteristic of FIG. 12, the filter band indicates the breadth of the valley of the curve. The user can understand the influence of the filter attenuation rate and the attenuation center frequency which is exerted on the evaluation function value.

Example 2

Figure 13:
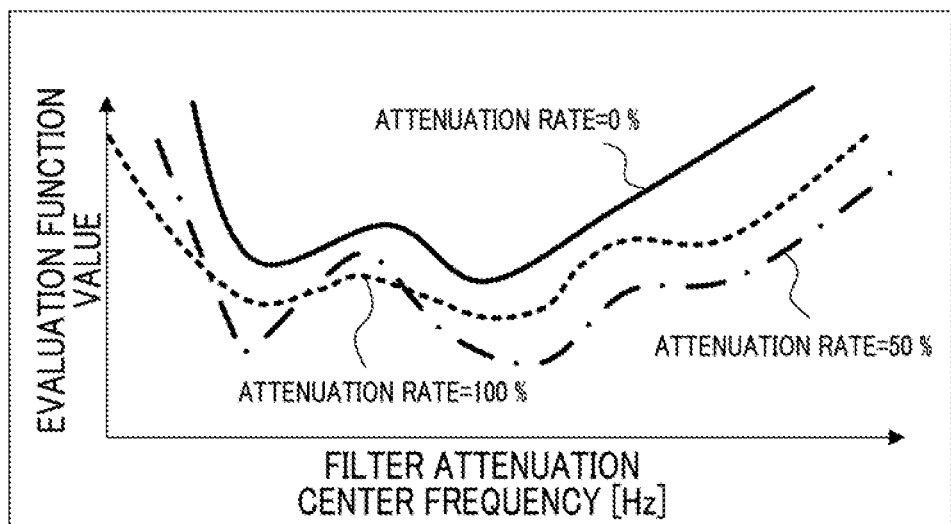
FIG. 13 are characteristic charts showing curves of the attenuation center frequency and the evaluation function value when the filter attenuation rate (attenuation coefficient (damping)) is changed to three fixed values.

The present example 2 is an example where characteristic charts showing curves of the attenuation center frequency and the evaluation function value when the filter attenuation rate (attenuation coefficient (damping)) is changed to three fixed values are displayed in the column P on the display screen P3 of the display unit 209. FIG. 13 are characteristic charts showing curves of the attenuation center frequency and the evaluation function value when the filter attenuation rate (attenuation coefficient (damping)) is changed to predetermined values (0%, 50% and 100%). The user can understand the influence of the filter attenuation rate which is exerted on the characteristics of the attenuation center frequency and the evaluation function value.

Example 3

Figure 14:
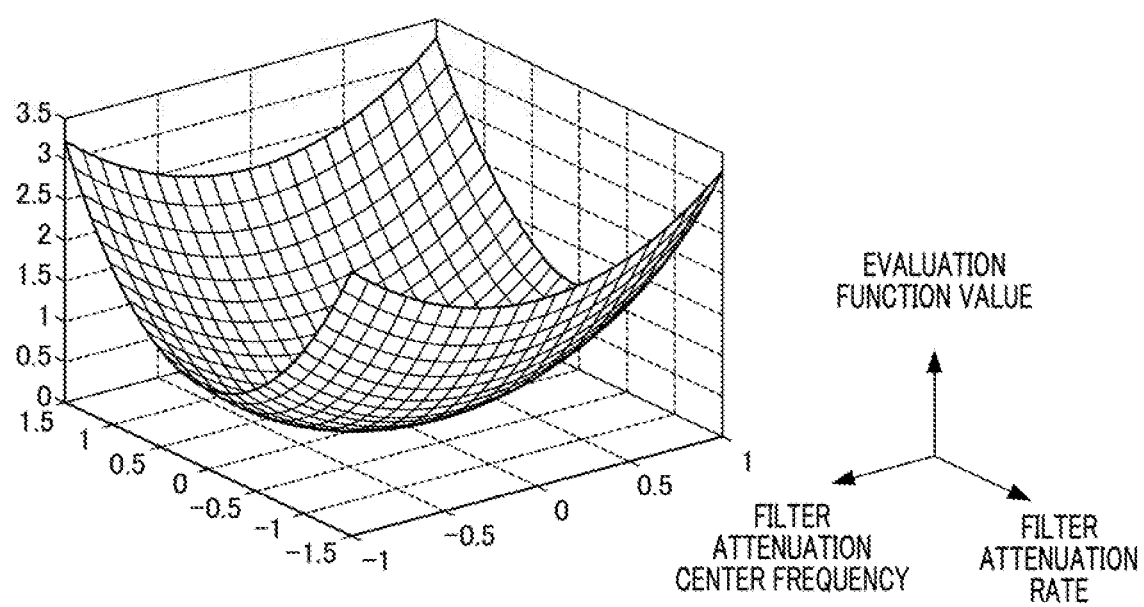
FIG. 14 is a three-dimensional chart showing a detailed relationship between the attenuation center frequency, the evaluation function value and the filter attenuation rate.

The present example 3 is an example where a three-dimensional chart (3D graph) showing a relationship between the attenuation center frequency, the evaluation function value and the filter attenuation rate (attenuation coefficient (damping)) is displayed in the column P3 on the display screen P. FIG. 14 is a three-dimensional chart, showing a further detailed relationship between the attenuation center frequency, the evaluation function value and the filter attenuation rate. In FIG. 14, the filter attenuation rate may be replaced with the filter band (bandwidth).

Figure 15:
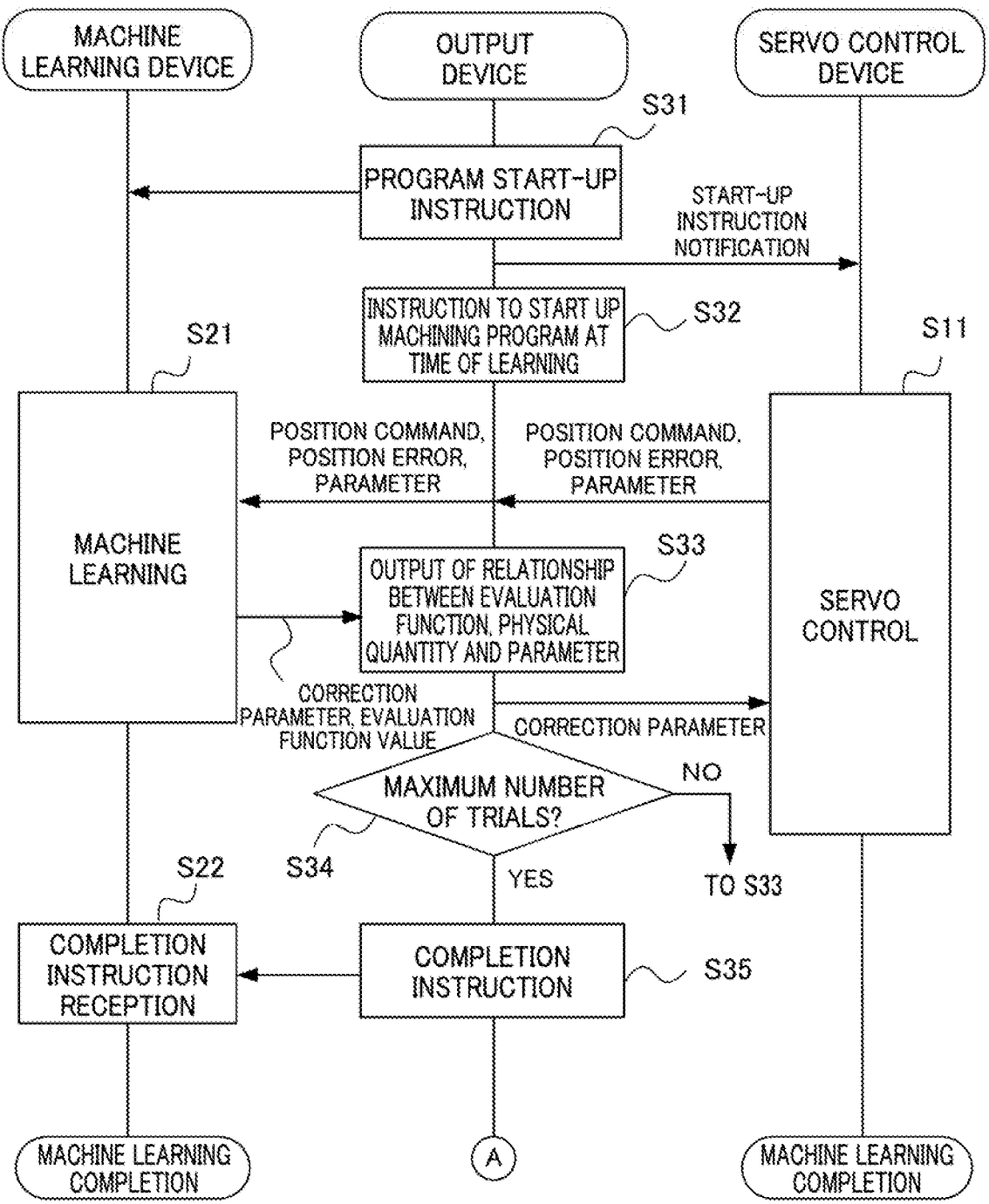
FIG. 15 is a flowchart showing the operation of the control device after the start of the machine learning until the completion of the machine learning while focusing attention on the output device.

The output function of the output device 200 has been described above. The relay function and the adjustment function of the output device 200 will then be described with reference to FIGS. 15 and 10. FIG. 15 is a flowchart showing the operation of the control device after the start of the machine learning until the completion of the machine learning while focusing attention on the output device. In step S31, in the output device 200, when the operator selects, with the operation unit 204 such as a mouse or a keyboard, the "program start-up" in the column P1 on the display screen P of the display unit 209 shown in FIG. 7, the control unit 205 outputs an instruction to start up the program through the information output unit 202 to the machine learning device 100. Then, the output device 200 outputs, to the servo control device 300, a program start-up instruction notification for notifying the output of the program start-up instruction for the learning to the machine learning device 100. In step S32, the output device 200 provides an instruction to start up the learning machining program to a high-level device which outputs the learning machining program to the servo control device 300. Step S32 may be performed before step S31 or simultaneously with step S31. When the high-level device receives the instruction to start up the learning machining program, the high-level device produces the position command and outputs it to the servo control device 300. In step S21, when the machine learning device 100 receives the instruction to start up the program, the machine learning device 100 starts the machine learning.

In step S11, the servo control device 300 controls the servo motor 400 so as to output, to the output device 200, the parameter information (coefficients $a_i$ and $b_j$) in the velocity feedforward processing unit 308 and the information including the position command and the position error. Then, the output device 200 outputs, to the machine learning device 100, the parameters, the position command and the position error.

The machine learning device 100 outputs, to the output device 200, the evaluation function value related to state S associated with the number of trials used in a reward output unit 2021 while the machine learning operation is being performed in step S21, the maximum number of trials, the number of trials and the correction information (serving as parameter correction information) of the coefficients $a_i$ and $b_j$ in the transfer function of the velocity feedforward processing unit 308. In step S33, when the "machine learning" in the column P1 on the display screen P shown in FIG. 7 is selected, the output device 200 uses the output function described above so as to produce, based on the correction information of coefficients in the transfer function of the velocity feedforward processing unit 308 which are being machine learned and the evaluation function value that are output from the machine learning device 100, a diagram showing a relationship between the physical quantities (such as the center frequency fc) which are easily understood by the user such as the operator and the evaluation function value, and displays it in the column P3 on the display screen P of the display unit 205 shown in FIG. 7. In step S33 or after or before step S33, the output device 200 feeds, to the servo control device 310, the correction information of the coefficients in the transfer function of the velocity feedforward processing unit 308. Step 311, step 321 and step 333 are repeatedly performed until the completion of the machine learning.

Although here, the case is described where information related to a figure showing a relationship between the physical quantities (such as the center frequency fc) of the coefficients in the transfer function of the velocity feedforward processing unit 308 related to the parameters which are being machine learned and the evaluation function is output in real time to the display unit 209, in the cases of examples 1 to 3 which have already been described as examples of the case where a display is not produced in real time, the information related to the figure showing the relationship between the physical quantities (such as the center frequency fc) of the coefficients in the transfer function of the velocity feedforward processing unit 303 and the evaluation function may be output to the display unit 209.

In step S34, the output device 200 determines whether or not the number of trials reaches the maximum number of trials, and when the maximum number of trials is reached, in step S35, the output device 200 feeds a completion instruction to the machine learning device 100. When the maximum number of trials is not reached, the process returns to step S33. In step S35, the output device 200 feeds a completion instruction to the machine learning device 100. When in step S22, the machine learning device 100 receives the completion instruction, the machine learning device 100 completes the machine learning.

The relay function of the output device 200 has been described above. The adjustment function of the output device 200 will then be described. When the user such as the operator sees the column P3 on the display screen P of the display unit 209 in the output device 200 shown in FIG. 7 while the machine learning is being performed or after the machine learning, the user may desire to provide an instruction to change the orders m and n of the coefficients in the velocity feedforward processing unit 308 to the servo control device 300 or an instruction to change or select the search range for the machine learning device 100. For example, when the user sees the evaluation function value in the scatter chart in the column P3 on the display screen P shown in FIG. 7, since in the machine tool, the evaluation function value is low at 250 Hz and 400 Hz, the user recognizes that it is highly likely that machine resonance occurs at the frequencies. In such a case, the user may desire to change the orders m and n of the coefficients $a_i$ and $b_j$ or to change the search range of the coefficients $a_i$ and $b_j$ in Expression 1. While the machine learning is being performed or after the machine learning, the output device 200 instructs the servo control device 300 to adjust the orders m and n of the coefficients $a_i$ and $b_j$ in the velocity feedforward processing unit or instructs the machine learning device 100 to perform relearning.

Figure 16:
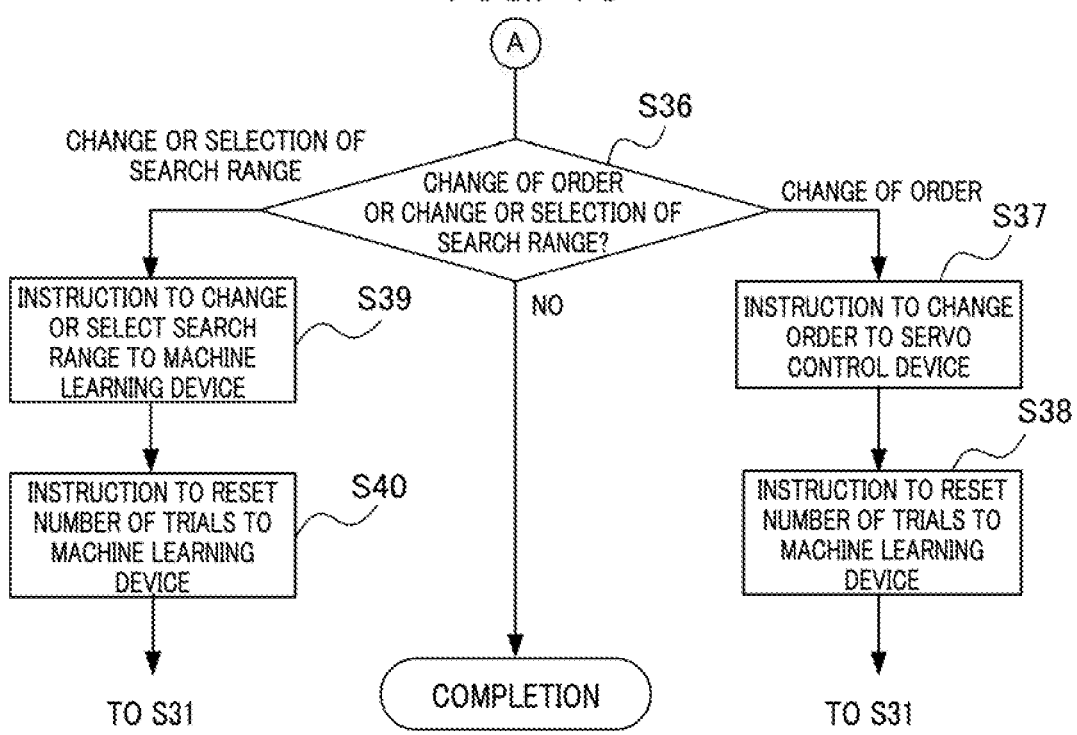
FIG. 16 is a flowchart showing the operation of the output device after a machine learning completion instruction.

FIG. 16 is a flowchart showing the operation of the output device after a machine learning completion instruction. When in step S35 of FIG. 15, after the output device 200 provides the completion instruction to the machine learning device 100, the user sees the evaluation function value in the scatter chart in the column P3 on the display screen P shown in FIG. 7, the user recognizes that it is highly likely that machine resonance occurs at the frequencies of 250 Hz and 400 Hz, and thereby selects "change" on the display screen P of FIG. 7 with the operation unit 204 such as a mouse or a keyboard. The control unit 205 displays within the display screen P of FIG. 7, for example, the formula of the transfer function indicated in Expression 3 and an input column for the orders m and n of the coefficients $a_i$ and $b_j$. The user recognizes, from the formula of the transfer function indicated in the right side of Expression 3, that the transfer function is formed with one filter, and in order to form two filters, the user changes the order m of the coefficient $a_i$ in the transfer function indicated in the right side of Expression 3 from "2" to "4" and the order n of the coefficient $b_j$ from "4" to "6". In step S36 of FIG. 16, the control unit 205 determines whether or not the order is changed or the search range is changed, and when the control unit 205 determines that as a result of the change of the order by the user, the order is changed, the control unit 205 displays the transfer function of Expression 5 on the display screen P of FIG. 7, and in step S37, the control unit 205 outputs, to the servo control device 300, a correction instruction including the correction parameters (the change values of the coefficients $a_i$ and $b_j$) in the velocity feedforward processing unit 303 and the orders m and n. The right side of m Expression 5 serves as a mathematical formula model. The change values of the coefficients $a_i$ and $b_j$ can be determined based on a coefficient in which the evaluation function value stored in the storage unit 206 is a local minimum value. The servo control device 310 uses, in step S11, the changed coefficients $a_i$ and $b_j$ so as to drive the machine tool, and outputs the changed coefficients $a_i$ and $b_j$ and the position error to the output device 200.

$$\frac{b_2 s^2 + b_3 s^3 + b_4 s^4 + b_5 s^5 + b_6 s^6}{a_0 + a_1 s + a_2 s^2 + a_3 s^3 + a_4 s^4} = \qquad \text{[Math. 5]}$$

$$J s^2 \cdot \frac{\omega_1^2 + 2R\zeta\omega_1 s + s^2}{\omega_1^2 + 2\zeta\omega_1 s + s^2} \cdot \frac{\omega_2^2 + 2R\zeta\omega_2 s + s^2}{\omega_2^2 + 2\zeta\omega_2 s + s^2}$$

In step S38, the output device 200 instructs the machine learning device 100 to reset the number of trials to "0". Step S38 may be performed simultaneously with step S37 or may be performed before step S37. The output device 200 returns to step S31 after step S38. Then, the machine learning based on steps S11, S21 and S31 to S33 is performed again.

In this way, the user observes the characteristics of the attenuation center frequency and the evaluation function value from the scatter chart in the column P3 on the display screen P of FIG. 7, changes the orders m and n of the coefficients $a_i$ and $b_j$ as necessary so as to perform the machine learning and thereby can adjust the coefficients $a_i$ and $b_j$ in the velocity feedforward processing unit 308.

On the other hand, when the user selects the button of "relearning" shown on the display screen P of FIG. 7, the control unit 205 displays the input column for the center frequency fc within the display screen P of FIG. 7. The user inputs, for example, 250 Hz and 400 Hz in the input column. In step S36 of FIG. 16, when the user inputs 250 Hz and 400 Hz in the input column as the center frequency fc, the control unit 205 determines the relearning, and instructs, in step S39, the machine learning device 100 to change or select the search range around 250 Hz and 400 Hz. Thereafter, in step S40, the output device 200 instructs the machine learning device 100 to reset the number of trials to "0". Step S40 may be performed simultaneously with step S39 or may be performed before step S39, The output device 200 returns to step S31 after step S40. When the machine learning device 100 receives the instruction to change or select the search range, and receives the instruction to start up the program, in step S21, the machine learning device 100 performs relearning around 250 Hz and 400 Hz. Here, the search range is changed such that the wide range is changed to a narrow range or is selected to be a range around 250 Hz and 400 Hz. For example, the search range is changed from a range of 100 Hz to 1000 Hz to a range of 200 Hz to 500 Hz or is selected to be a range of 200 Hz to 300 Hz or a range of 400 Hz to 500 Hz. The output device 200 displays, based on the changed coefficients $a_i$ and $b_j$ and the evaluation function value fed from the machine learning device 100, an attenuation center frequency-evaluation function value scatter chart in the column P3 on the display screen P of the display unit 209 shown in FIG. 7, and feeds the changed coefficients $a_i$ and $b_j$ to the servo control device 300. In this way, the machine learning based on steps S11, S21 and S31 to S33 is performed again.

In this way, the user observes the characteristics of the attenuation center frequency and the evaluation function value from the scatter chart displayed in the column P3 on the display screen P of FIG. 7, and changes or selects the search range of the machine learning as necessary so as to make the machine learning device 100 perform the machine learning and thereby can adjust the coefficients $a_i$ and $b_j$ in the velocity feedforward processing unit 308. Although the output device and the control device of the first embodiment have been described above, the output devices and the control device of second and third embodiments will then be described.

Second Embodiment

Figure 17:
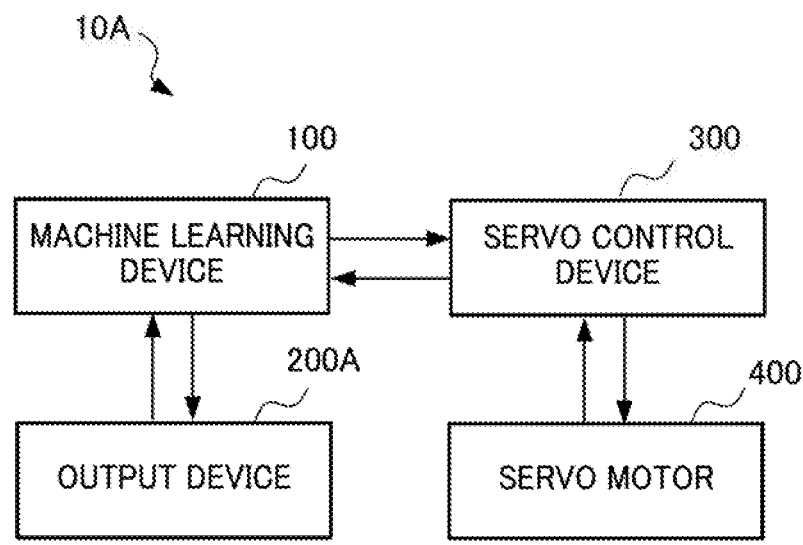
FIG. 17 is a block diagram showing an example of the configuration of a control device according to a second embodiment of the present invention.

In the first embodiment, the output device 200 is connected to the servo control device 300 and the machine learning device 100, and performs the relay of information between the machine learning device 100 and the servo control device 300 and the control of the operations of the servo control device 300 and the machine learning device 100. In the present embodiment, a case where the output device is connected to only the machine learning device will be described. FIG. 17 is a block diagram showing an example of the configuration of a control device according to the second embodiment of the present invention. The control device 10A includes the machine learning device 100, an output device 200A, the servo control device 300 and the servo motor 400. As compared with the output device 200 shown in FIG. 6, the output device 200A does not include the information acquisition unit 217 and the information output unit 218.

Since the output device 200A is not connected to the servo control device 300, the output device 200A does not performs the relay of information between the machine learning device 100 and the servo control device 300 and the transmission and reception of information with the servo control device 300. Specifically, the output device 200A performs the learning program start-up instruction in step S31 and the physical quantity output of parameters in step S33 and the relearning instruction in step S35 shown in FIG. 15 but does not perform the other operations (for example, steps S32 and S34) shown in FIG. 15. In this way, since the output device 200A is not connected to the servo control device 300, the operation of the output device 200A is reduced, and thus the configuration of the device can be simplified.

Third Embodiment

Figure 18:
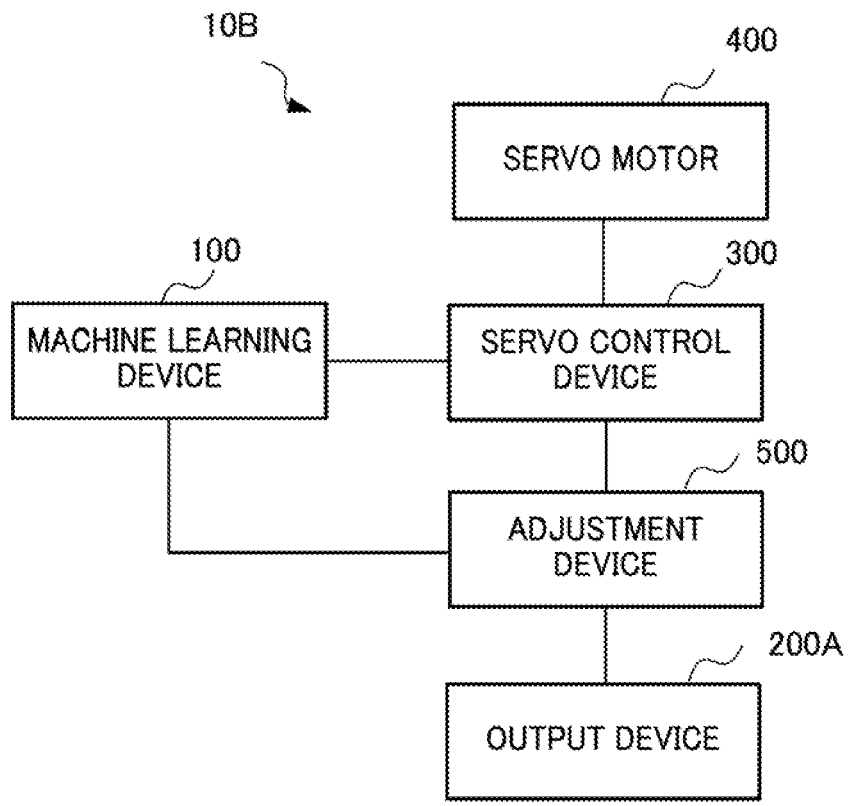
FIG. 18 is a block diagram showing an example of the configuration of a control device according to a third embodiment of the present invention.

Although in the first embodiment, the output device 200 is connected to the servo control device 300 and the machine learning device 100, in the present embodiment, a case where an adjustment device is connected to the machine learning device 100 and the servo control device 300 and where the output device is connected to the adjustment device will be described. FIG. 18 is a block diagram showing an example of the configuration of a control device according to the third embodiment of the present invention. The control device 10B includes the machine learning device 100, an output device 200A, the servo control device 300 and the adjustment device 500. Although the output device 200A shown in FIG. 16 has the same configuration as the output device 200A shown in FIG. 17, the information acquisition unit 211 and the information output unit 212 are connected not to the machine learning device 100 but to the adjustment device 700. The adjustment device 500 is configured such that the drawing unit 203, the operation unit 204, the display unit 209 and the operation unit 2100 in the output device 200 of FIG. 6 are omitted.

Although the output device 200A shown in FIG. 18 performs, as with the output device 200A of the second embodiment shown in FIG. 17, not only the learning program start-up instruction in step S31, the physical quantity output of parameters in step S33 and the fine adjustment instruction of parameters in step S34 shown in FIG. 15 but also the relearning instruction in step S35, these operations are performed through the adjustment device 700. The adjustment device 500 relays information between the machine learning device 100 and the servo control device 300. The adjustment device 500 relays the learning program start-up instruction and the like on the machine learning device 100 performed by the output device 200A, and outputs the start-up instructions to the machine learning device 100. In this way, as compared with the first embodiment, the function of the output device 200 is separated to the output device 200A and the adjustment device 500, and thus the operation of the output device 200A is reduced, with the result that the configuration of the device can be simplified.

Although the embodiments according to the present invention have been described above, the servo control device and individual constituent units included in the machine learning device and the output device can be realized by hardware, software or a combination thereof. The servo control method which is performed by cooperation of the individual constituent units included in the servo control device can also be realized by hardware, software or a combination thereof. Here, being realized by software means being realized when a computer reads and executes a program.

The programs can be stored with various types of non-transitory computer readable storage media and can be supplied to a computer. The non-transitory computer readable storage media include various types of tangible storage media. Examples of the non-transitory computer readable storage medium include magnetic recording media (for example, a flexible disk and a hard disk drive) and magneto-optical storage media (for example, a magneto-optical disk), a CD-ROM (Read Only Memory), a CD-R, a CD-R/W and semiconductor memories (for example, a mask ROM, a PROM (Programmable ROM), an EPROM (Erasable PROM), a flash ROM and a RAM (random access memory)).

The above-described embodiment is a preferred embodiment and example of the present invention. However, the scope of the present invention is not limited to the embodiment and example only but the present invention can be embodied in various modifications without departing from the spirit of the present invention.

<Variations where Output Device is Included in Servo Control Device or Machine Learning Device>

In the embodiments discussed above, the first and second embodiments where the machine learning device 100, the output device 200 or 200A and the servo control device 300 are formed as the control device 10 and furthermore, the third embodiment where the output device 200 is separated to the output device 200A and the adjustment device 500 and is provided in the control device are described. Although in these embodiments, the machine learning device 100, the output device 200 or 200A, the servo control device 300 and the adjustment device 500 are formed with separate devices, one of these devices may be integrally formed with another device. For example, part or the whole of the function of the output device 200 or 200A may be realized with the machine learning device 100 or the servo control device 300. The output device 200 or 200A may be provided outside the control device formed with the machine learning device 100 and the servo control device 300, <Freedom in System Configuration>

Figure 19:
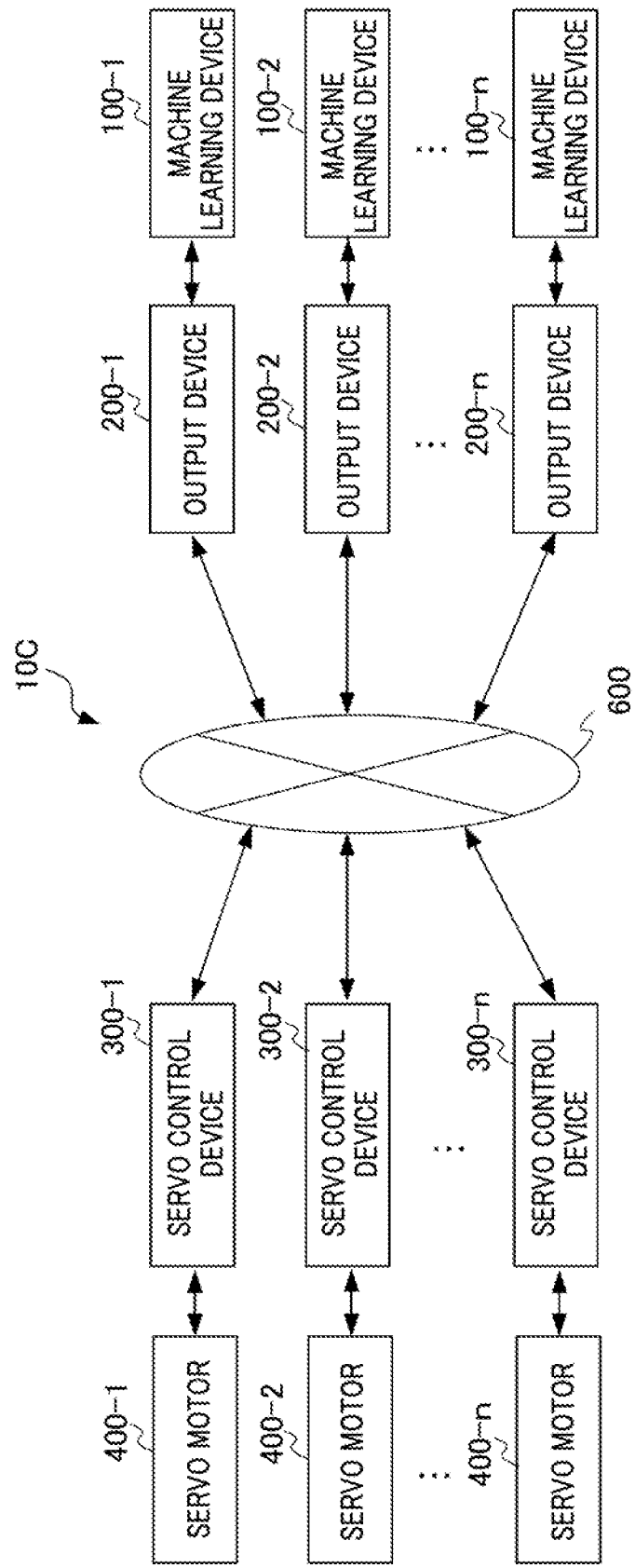
FIG. 19 is a block diagram showing a control device which has another configuration.

FIG. 19 is a block diagram illustrating a control device according to another embodiment, of the present invention. As shown in FIG. 19, the control device 10C includes n machine learning devices 100-1 to 100-n, output devices 200-1 to 200-n, servo control devices 300-1 to 300-n, servo motors 400-1 to 400-n and a network 600. n is an arbitrary natural number. Each of the n machine learning devices 100-1 to 100-n corresponds to the machine learning device 100 shown in FIG. 5. The output devices 200-1 to 200-n correspond to the output device 200 shown in FIG. 6 or the output device 200A shown in FIG. 17. Each of the n servo control devices 300-1 to 300-n corresponds to the servo control device 300 shown in FIG. 2. The output device 200A and the adjustment device 500 shown in FIG. 18 correspond to the output devices 200-1 to 200-n.

Here, the output device 200-1 and the servo control device 300-1 are formed as a one-to-one pair, and are connected so as to be able to communicate with each other. The output devices 200-2 to 200-n and the servo control devices 300-2 to 300-n are also connected as with the output device 200-1 and the servo control device 300-1. Although in FIG. 19, n pairs of the output devices 200-1 to 200-n and the servo control devices 300-1 to 300-n are connected through the network 600, in the n pairs of the output devices 200-1 to 200-n and the servo control devices 300-1 to 300-n, the output device and the servo control device in each of the pairs may be directly connected through a connection interface. In the n pairs of the output devices 200-1 to 200-n and the servo control devices 300-1 to 300-n, for example, a plurality of pairs may be installed in the same factory or they may be respectively installed in different factories.

The network 600 is, for example, a LAN (Local Area Network) established within a factory, the Internet, a public telephone network or a combination thereof. A specific communication method in the network 600, whether or not wired connection or wireless connection is used and the like are not particularly limited.

Although in the control device of FIG. 19 described above, the output devices 200-3 to 200-n and the servo control devices 300-1 to 300-n are connected as one-to-one pairs so as to be able to communicate with each other, for example, a configuration may be adopted in which one output, device 200-1 is connected to a plurality of servo control devices 300-1 to 300-m (m<n or m=n) through the network 600 so as to be able to communicate with each other, and in which one machine learning device connected to the one output device 200-1 performs the machine learning on the individual servo control devices 300-1 to 300-m. In this case, a distributed processing system may be adopted, in which the respective functions of the machine learning device 100-1 are distributed to a plurality of servers as appropriate. The functions of the machine learning device 100-1 may be realized by utilizing a virtual server function, or the like, in a cloud. When there is a plurality of machine learning devices 100-1 to 100-n respectively corresponding to a plurality of servo control devices 300-1 to 300-n of the same type name, the same specification, or the same series, the machine learning devices 100-1 to 100-n may be configured to share the learning results in the machine learning devices 100-1 to 100-n. By doing so, a further optimal model can be constructed.

EXPLANATION OF REFERENCE NUMERALS 10, 10A, 10B, 10C control device
100 machine learning device 200 output device
211 information acquisition unit
212 information output unit
213 drawing unit
214 operation unit
215 control unit
216 storage unit
217 information acquisition unit
213 information output unit
219 display unit
210 operation unit
300 servo control device
400 servo motor
500 adjustment device
600 network

What is claimed is:

1. An output device comprising:
an information acquisition unit which acquires, from a machine learning device that performs machine learning on a servo control device for controlling a servo motor driving an axis of a machine tool, a robot or an industrial machine,
  (i) a parameter of a constituent element of the servo control device that is being machine learned or has been machine learned, or a first physical quantity of the constituent element of the servo control device that is being machine learned or has been machine learned, and
  (ii) an evaluation function value; and
an output unit which outputs information indicating a relationship between (i) the evaluation function value and (ii) the parameter, the first physical quantity, or a second physical quantity determined from the parameter,
wherein the output unit includes a display unit which displays, on a display screen, a diagram which depicts the relationship between (i) the evaluation function value and (ii) the parameter, the first physical quantity, or the second physical quantity,
the parameter is a coefficient in a transfer function of the constituent element of the servo control device,
the output unit determines whether or not an order of the coefficient has been changed by a user, and
when the output unit determines that the order of the coefficient has been changed by the user, the output unit outputs, to the servo control device, a correction instruction including a change of an order of the coefficient.

2. The output device according to claim 1, wherein based on the information, an instruction to change or select the parameter of the constituent element of the servo control device or a search range of the machine learning of the first physical quantity is provided to the machine learning device.

3. The output device according to claim 1, wherein the parameter of the constituent element of the servo control device includes a parameter of a mathematical formula model or a filter.

4. The output device according to claim 3, wherein the mathematical formula model or the filter is included in a velocity feedforward processing unit or a position feedforward processing unit, and the parameter includes a coefficient in a transfer function of the filter.

5. A control device comprising: the output device according to claim 1;
the servo control device which controls the servo motor that drives the axis of the machine tool, the robot or the industrial machine; and
the machine learning device which performs the machine learning on the servo control device.

6. The control device according to claim 5, wherein the output device is included in one of the servo control device and the machine learning device.

7. A method of outputting an evaluation function value of an output device which is used in machine learning of a machine learning device that performs the machine learning on a servo control device for controlling a servo motor driving an axis of a machine tool, a robot or an industrial machine, the method comprising:
acquiring, from the machine learning device,
  (i) a parameter of a constituent element of the servo control device that is being machine learned or has been machine learned, or a first physical quantity of the constituent element of the servo control device that is being machine learned or has been machine learned, and
  (ii) the evaluation function value; and
outputting information indicating a relationship between (i) the evaluation function value and (ii) the parameter, the first physical quantity, or a second physical quantity determined from the parameter,
wherein the outputting comprises displaying, on a display screen, a diagram which depicts the relationship between (i) the evaluation function value and (ii) the parameter, the first physical quantity, or the second physical quantity,
the parameter is a coefficient in a transfer function of the constituent element of the servo control device,
the outputting further comprises determining whether or not an order of the coefficient has been changed by a user, and
when it is determined that the order of the coefficient has been changed by the user, the outputting further comprises outputting, to the servo control device, a correction instruction including a change of an order of the coefficient.

* * * * *